United States Patent
Qureshi et al.

(10) Patent No.: US 6,396,500 B1
(45) Date of Patent: May 28, 2002

(54) METHOD AND SYSTEM FOR GENERATING AND DISPLAYING A SLIDE SHOW WITH ANIMATIONS AND TRANSITIONS IN A BROWSER

(75) Inventors: Imran I. Qureshi, Sunnyvale; Ralph U. Gasser, Mountain View; Gustavo Sandoval; Robert L. C. Parker, both of Cupertino, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/271,731

(22) Filed: Mar. 18, 1999

(51) Int. Cl.$^7$ .................................................. G06T 17/00
(52) U.S. Cl. ...................... 345/473; 345/474; 345/418; 345/619
(58) Field of Search .................................. 345/418, 473, 345/474, 619, 434, 435, 436, 437, 438, 439

(56) References Cited

U.S. PATENT DOCUMENTS 6,181,342 B1 * 1/2001 Niblack ...................... 345/356

* cited by examiner

Primary Examiner—Cliff N. Vo
(74) Attorney, Agent, or Firm—Christensen O'Connor Johnson Kindness PLLC

(57) ABSTRACT

A method and system for automatically translating slides in a slide presentation file into a series of corresponding slide HTML pages for displaying a slide show with a viewing facility such as a browser. An animated object is generated for each object in the HTML page that is related to an animation of the object in the corresponding slide created for presentation by the other facility. A queue is generated for defining the order and time line for the graphical display of each animated and non-animated object of each HTML page. The browser graphically displays the contents of each HTML page in accord with the order and time line defined by the queue so that a graphical display of the generated slide show is presented to the user in a manner that is related to the intended presentation by the other facility of the originally created slide show. Divisions in the HTML page are created with nested DIV tags so that percentages related to default dimensions in the HTML page may be used to define the dimensions of a display space for objects included in the HTML page. The objects may include text, movies, audio clips, animations, transitions, images, and image maps associated with hyperlinks. User interface controls are provided to select options for animating objects and transitions and automatically fitting the objects in the page to the size of the display.

41 Claims, 17 Drawing Sheets

Slide0001.htm
```
<html>
<body>
```
352 — `<div id="SlideObj" style = "position: absolute;`    360

`top:0; left:0; width:640px; height:480px;`

`background-color: white; font size:16; clip:rect(0%,`

`101%, 101%, 0%); visibility: hidden">`

362 — `<div style = "position: absolute; top: 80.25%;`

`left:8.5%; width:52.99%; height:9.03%; font size:75%">`
    SAILING IS A POPULAR SPORT WORLDWIDE.

364 — `<div style = "position:absolute;`

`top:30%;left:40%;width:70%;height:60%;font`

`size:75%">A PICTURE OF MY BOAT</div>`

370 — `< map name="map1">`

`< area onclick="window.event.cancelBubble=true"`

`target=" parent" ;href="http://msw/hrweb";`

`shape = "polygon" ;`

`coords="1, 1, 1, 64, 64, 64, 64, 1">`

`< /map>`

366 — `< div style = "position: absolute; top: 105%;`

`left: 500%; width: 95%; height: 1000%">`

368 — `<img src = "sailboat1.bmp"; usemap="map1";>`

`</div>`

`</div>`

```
</body>
</html>
```

FIG. 5

METHOD AND SYSTEM FOR GENERATING AND DISPLAYING A SLIDE SHOW WITH ANIMATIONS AND TRANSITIONS IN A BROWSER

FIELD OF THE INVENTION

The present invention relates to the graphical display of slides in a display, and more particularly, to a method and a system for translating slides into pages of animated and non-animated objects for graphical display as a slide show by a viewing facility such as a browser.

BACKGROUND OF THE INVENTION

Computer programs often have associated data files that are processed by the computer program during its normal execution. A data file can contain information that is processed and presented to a user either in a video presentation or an audio presentation, or a combination of video and audio. Presentation programs are examples of computer programs that process an associated data file.

Presentation programs enable a user to create, edit, manage, and perform "presentations" such as a slide show displayed by a computer. One example of a popular presentation program is "PowerPoint," available from "Microsoft Corporation", of Redmond, Washington. A slide show presentation includes a set of electronic "slides," each slide corresponding to one screen or page of output. An electronic slide may also be converted to a 35 mm or overhead transparency and displayed in a standard slide projector or overhead projector. Each slide contains one or more objects, such as text, graphical images, or graphic automation. A slide may also include a sound object or video that is played when the slide is displayed during a "slide show" performance.

A presentation program "performs" a slide show by sequentially displaying a series of slides contained within the slide show presentation. The slides are displayed on a computer screen or projected onto a separate surface. During a performance of a slide show, a "presenter" controls the performance by invoking commands to "advance" to the next slide. A command can be entered using a keyboard, a mouse, or another suitable input device.

Alternatively, an author of a slide show presentation can include slide "timings" with each slide. A slide timing corresponding to a slide indicates the number of seconds that the slide is displayed before the presentation program automatically advances to the next slide. During a performance of a slide show, a slide show presentation will automatically advance to the next slide when the existing slide's timing ends. An ordered sequence of slides is predetermined by a slide show presentation author. During a performance of a slide show, a presenter can enter commands to alter the sequence of slides.

The "PowerPoint" program enables a user to save a slide show in an associated slide presentation file, so that the slide show can be recreated at another location that has access to "PowerPoint" and the slide presentation file. Unfortunately, a presentation program such as "PowerPoint" is not commonplace and many computer users do not have access to this type of program. In the past, slide presentation files were often distributed on a storage medium that also contained at least a display only version of the presentation program for graphically displaying the slide show to a user with the information stored in the slide presentation file. Since there is limited space available on a contemporary storage medium that is intended for mass distribution, the number and size of slide presentation files that can economically be distributed in this manner is presently limited. Additionally, since a slide show included in a slide presentation file must be displayed with some version of a presentation program, additional effort is required to locate, purchase and install the program before the slide show can be graphically displayed to other users, if not previously installed.

An on-line information system typically includes one computer system (a server) that makes information available so that other computer systems (clients) can remotely access the information. The server manages access to the information, which can be structured as a set of independent on-line services. The server and client communicate via messages conforming to a communication protocol and sent over a communication channel such as a computer network or through a dial-up connection.

Information resources managed by the server may include files, databases, and programs on the server system or on an external computer system. The information that the server provides may simply be stored on the server, may be converted from other formats manually or automatically, may be computed on the server in response to a client request, may be derived from data and programs on the server or other machines, or may be derived by any combination of these techniques.

The user of an on-line service typically uses a browser program executed on the client system to access the information managed by the on-line service. The browser enables the user to selectively view, search, download, print, edit, and/or file the information managed by the server. On-line services are available on the World Wide Web (WWW, which operates over the global Internet. The Internet interconnects a large number of otherwise unrelated computers or sites. Similar services are available on private networks called Intranets that may not be connected to the Internet, and through local area networks (LANs). The WWW and similar private architectures provide a "web" of interconnected document objects. On the WWW, these document objects are located at various sites on the global Internet.

Among the types of document objects in an on-line service are documents and scripts. Documents that are published on the WWW are written in the Hypertext Markup Language (HTML). HTML documents can be created using programs specifically designed for that purpose or by executing script files. An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of exemplary HTML code briefly illustrate how the language is used in a sample HTML document:

Some words are <B>bold</B>, others are <I>italic</I>. Here we start a new paragraph.<P>

Here's a hyperlink to the <A HREF="http://www.microsoft.com">Microsoft Corporation </A>home page.

This sample HTML document is a hypertext document because it contains a hypertext link to another document in the line that includes "HREF=." The format of this link is described below. A hypertext document may also have a link to other parts of the same document. Linked documents may generally be located anywhere on the Internet. When a user is viewing the document using a browser, the links are displayed as highlighted words or phrases. For example, using a browser, the sample document above might be displayed on the user's screen as follows:

Some words are bold, others are italic. Here we start a new paragraph.

Here's a link to the Microsoft Corporation home page.

In a browser, the link may be selected, for example, by clicking on the highlighted area with a mouse. Typically, the screen cursor changes when positioned on a hypertext link. Selecting a link will cause the associated document to be displayed. Thus, clicking on the highlighted text "Microsoft Corporation" would fetch and display the associated home page for that entity. Similarly, the HTML language also provides a mechanism (the image or "IMG" element) that enables an HTML document to include an image that is stored as a separate file. When the end user views the HTML document, the included image is displayed as part of the document, at the point where the image element was positioned in the document. Also, when the user is viewing an HTML page that includes a display of a thumbnail image using a browser, a hyperlink connection from the thumbnail image to the original image can be activated by selecting the displayed thumbnail image. In this way, the original image is retrieved and graphically displayed when the user selects the thumbnail image.

One of the most commonly installed programs on a computer is a browser for graphically displaying an HTML page that may be accessed locally or through an on-line service connected to a network such as the Internet. The browser program may be a stand-alone program such as the "Microsoft Corporation's Internet Explorer" or the browser's functionality may be integrated into a computer operating system, e.g., the "Windows 98" operating system available from the "Microsoft Corporation." Although the browser is used to generate a graphical display of objects included in an HTML page, the dimensions of the browser's display window can differ from the dimensions initially coded for the display space of the page. The size of the browser's display window can vary according to the resolution of the video display or the window dimensions that are selected by a user.

In the prior art, one solution to this problem has been to create different HTML pages that are encoded for different video display resolutions in an HTML document. Another solution has been to create all of the HTML pages in a document at the lowest video display resolution offered by most video displays, e.g., 640×480. None of the prior art solutions solve the problem of automatically fitting the graphical display of an HTML page to a display window that has dimensions that are different than the dimensions initially encoded for the HTML page.

It is desirable to have a facility that enables a presentation program to generate an HTML document that includes a set of HTML pages that closely relate to each slide in a slide presentation file created by the program. Preferably, such a facility would enable another user to employ another program, such as a browser, that is already installed on the other user's computer to present a slide show with a graphical display of the HTML document by the browser. In this case, when the HTML document related to the slide show presentation is distributed to other users on a storage medium, the medium would not have to include a version of the presentation program. Since more of the capacity of the storage medium could be used for storing HTML documents related to slide show presentations, significantly larger slide show presentations could be distributed on the same storage medium.

Also, an HTML document corresponding to the slide show presentation could be distributed over a network as an information resource with an on-line service, so that another user could easily download the document to their computer and graphically display the HTML pages corresponding to the slides in the slide show presentation with an HTML-enabled facility already installed on the computer such as a browser program. It is also preferable that the facility would automatically fit the dimensions and positions of a graphical display of objects in an HTML page to a display and a window in the display when the size of the window dimensions are different than the display space of the HTML page.

Additionally, the slide show presentation may include animations that are either associated with objects in a slide and/or transitions between slides. The object animations could include scaled and nonscaled effects such as crawl, fly, zoom, stretch, spiral and swivel. The transition animation types could comprise dissolve, checkerboard, and wipe effects. Also, transition animations could be started automatically based on a predetermined time interval such as provided for in a "kiosk" style slide show and/or they could be selected, e.g., an input from a pointing device and/or a keyboard could cause an animated transition to occur.

It is also desirable to have a facility that enables the user to include both object and transition animations in an HTML document generated from a plurality of slides originally created with a presentation program. The animations would be closely related to the corresponding object and transition animations included in the slides that are used to generate the HTML document. Preferably, such a facility would enable different modes for graphically displaying the animations along with the contents of a scaleable HTML page in an HTML-enabled viewing program such as a browser. One mode might cause the browser to present the generated slide show in a window of the display and another might present the slide show as a full-screen display.

SUMMARY OF THE INVENTION

The present invention provides a method for generating a slide show for graphical display by a viewing facility. The slide show is generated from a plurality of slides that were originally created for a slide show to be presented with another facility. Each object in the plurality of slides originally created for presentation by the other facility is saved in a corresponding series of pages. The contents of the pages, e.g., an object disposed in a display space, are included in a container for the page. The size of the display space is related to the size of the container. Also, the size and position of the object in the display space of the page is related to the size of the page's display space.

The present invention generates an animated object for each object in the page that is related to an animation of the object in the corresponding slide created for presentation by the other facility. Each animated object is included in the container for the page. The present invention generates a queue for ordering the display of each object and each animated object in each container of each page. The queue defines an order and time line and for presenting the generated slide show to a user.

A viewing facility is employed to display the contents of each container for each page in accord with the order and time line defined by the queue. The generated slide show is presented to the user in a graphical display that is related to the intended presentation by the other facility of the originally created slide show.

In accordance with other aspects of this invention, an animated transition is generated for each page that is related to an animation of the transition between the corresponding slide and the next slide in the slide show created for presentation by the other facility. The animated transition is added to the queue, so that the animated transition is presented between the display of a slide in the generated slide show that corresponds to the page and a next slide in the generated slide show.

In accordance with further aspects of this invention, an object animation tag is generated for each animated object and stored in the container for the associated page. Similarly, a transition animation tag is stored in the container for the associated page. The object and transition animation tags identify respective parameters including type, duration and order. The respective parameters for the object animation tag and the transition animation tag are employed to generate the queue that defines the order and time line for presenting the generated slide show.

In accordance with another aspect of the present invention, the user may select a mode for displaying the generated slide show with the viewing facility. The selectable modes include a window and full screen. The size of the full screen mode is set equal to the dimensions of a display displaying the generated slide show to the user. Additionally, the user may separately select an entry and an exit animation and/or sound for each animated object. Also, the user may select a shape attached to a non-animated object to be animated.

In accordance with still further aspects of this invention, the user may reorder the display of each object and each animated object in each container of each page so that the queue defining the order and time line for presenting the generated slide show is changed. A preview of the presentation of the generated slide show may be selected for a thumbnail display. Also, the user may select an object in a page to be animated or not. The user may also select a trigger for starting the animation of the animated object. The trigger may include a time interval and the selection of the animated object by a pointing device.

In accordance with other aspects of this invention, the animation may be an in-place animation, comprising: box in, box out, wipe up, circle in, circle out, wipe down, wipe right, wipe left, vertical blinds, horizontal blinds, checkerboard across, checkerboard down, random dissolve, split vertical in, split vertical out, strips left down, strips left up, strips right down, strips right up, random bars horizontal, random bars vertical and random in-place animation. The animation may also be a nonscaled effect, including crawl, peek and fly. Further, the animation could be a scaled effect such as spiral, zoom, stretch, and swivel.

In accordance with still other aspects of this invention, a movie, sound and/or video clip may be played with the presentation of the generated slide show. The user may select a start index and an end index for the sound clip associated with the presentation of the generated slide show. The user may also select a continuously looped display of a movie clip or cause the clip to rewind after it is displayed. The presentation of the slide show may be paused when the clip is playing or automatically end when the playing of the clip is completed. Also, the playing of the clip may be selected to end after the presentation of a selected number of slides in the generated slide show by the viewing facility.

In accordance with further aspects of this invention, a chart element animation tag may be generated for each chart element in the page that is related to the animation of the chart element in the corresponding slide created for presentation by the other facility. An animated chart element is generated for each chart element animation tag and included in the container for the page. The chart element may include a legend, grid, text, and graphics. The animated chart element is added to the queue, so that it will be presented in the generated slide show by the viewing facility. The user may select an entry and exit animation and/or sound for each animated chart element. Also, the user may select the order for displaying the animated chart element.

In accordance with still further aspects of this invention, a size and a position for each object included in each page are generated, the size and the position of each object being related to the size of the display space and being stored in the container of the page associated with the object. The present invention determines if a dimension of a display is different than a corresponding dimension of the display space of the page. If so, a scalar is generated that is related to the difference in the dimension of the display and the corresponding dimension of the display space of the page. The scalar is employed to calculate another size for the display space of the page, which is related to the size of a display and a default size of the page. The calculation of the other size of the display space causes the related size and position of the object to be changed in proportion to the other size of the display space. The graphical display of the display space of the page and the changed size and position of the object are automatically relocated in the display, so that the user can view the object in the display space without having to scroll the graphical display of the display space.

Additionally, the page, the display space and the object may be encoded with a computer language selected from a group including HTML, DHTML, CGI, JavaScript, VBScript and VRHTML. The computer language may support a DIV tag to create sizes and positions that are percent-based for the scaleable page, the display space and the object.

In accordance with yet another aspect of this invention, the dimensions of the display space, scaleable, page and the dimensions and position of the object may be measured in the lines of resolution for the display. In this way, the graphical display of the display space and the object may be automatically adjusted to the dimensions of the display. Also, the graphical display of the object in the display space may be automatically fitted to the size of the display when at least one of the dimensions of the display is dynamically changed.

In accordance with other aspects of this invention, the viewing facility may be a browser program or a program module associated with another program including an operating system, presentation, editor, spread sheet, information organizer, and database. The viewing facility supports controls for advancing, reversing, pausing, and exiting the presentation of the slide show.

In accordance with other aspects of the invention, a first facility could be employed to generate the pages from the slide show created for presentation by the other facility and the second facility could be employed to generate the slide show for presentation by the viewing facility. Also, the first and second facilities could be program modules for the same program. Additionally, the first facility may be executed within the other facility that created the slide show for presentation by the other facility. Furthermore, the second facility may be executed by the viewing facility.

In accordance with still further aspects of the invention, a computer-readable medium may have computer-executable instructions for performing substantially the same method described above. Also, a computer system may implement logical instructions that similarly perform the above-identified method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 shows an exemplary HTML code listing that illustrates how different types of objects are nested in the slide HTML page;

DETAILED DESCRIPTION OF THE PREFERRED EMBODIMENTS

The present invention translates slides for a slide presentation into an HTML document that includes slide HTML pages for presenting a slide show with an HTML-enabled viewing facility such as a browser program. Also, the functionality of the viewing facility may be integrated with another program including presentation, editor, spread sheet, information organizer, and database. Typically, the slide presentation will include a plurality of slides that were previously created with a presentation program such as "PowerPoint." The present invention generates a slide HTML page for each slide and the page may include objects and animations that are substantially similar to the content of the slide. Generally, a first facility translates at least one slide of the slide presentation that contains different types of objects, including animations, transitions, movies and audio clips, into a slide HTML page that includes corresponding objects. In one embodiment of the invention described below, slides with graphically displayable objects in a slide presentation file are used to generate a plurality of corresponding slide HTML pages. It is envisioned that other types of files that include slides and/or pages with graphically displayable objects could also be translated into slide HTML pages corresponding to each slide/page. These other types of files might be created with other programs, including word processors, desktop publishers, spreadsheets, editors, and databases.

Additionally, the first facility may be used to define animations, movies and audio for the objects in the slide HTML page and animated transitions between the slide HTML pages. The present invention provides for either automatically and/or manually generating effects such as animations, movies and audio for objects and transition animations that may be either similar to the original effects in the slide presentation file or customized.

The present invention provides a second facility that automatically plays the animations, movies, audio clips and transitions of the objects included in the slide HTML page. The second facility may also automatically size and maintain the original aspect ratio for the objects in the slide HTML page when the page is graphically displayed in either a window or the full screen of the display, which may have dimensions that are different than the values originally encoded for the page.

Exemplary Operating Environment

Figure 1:
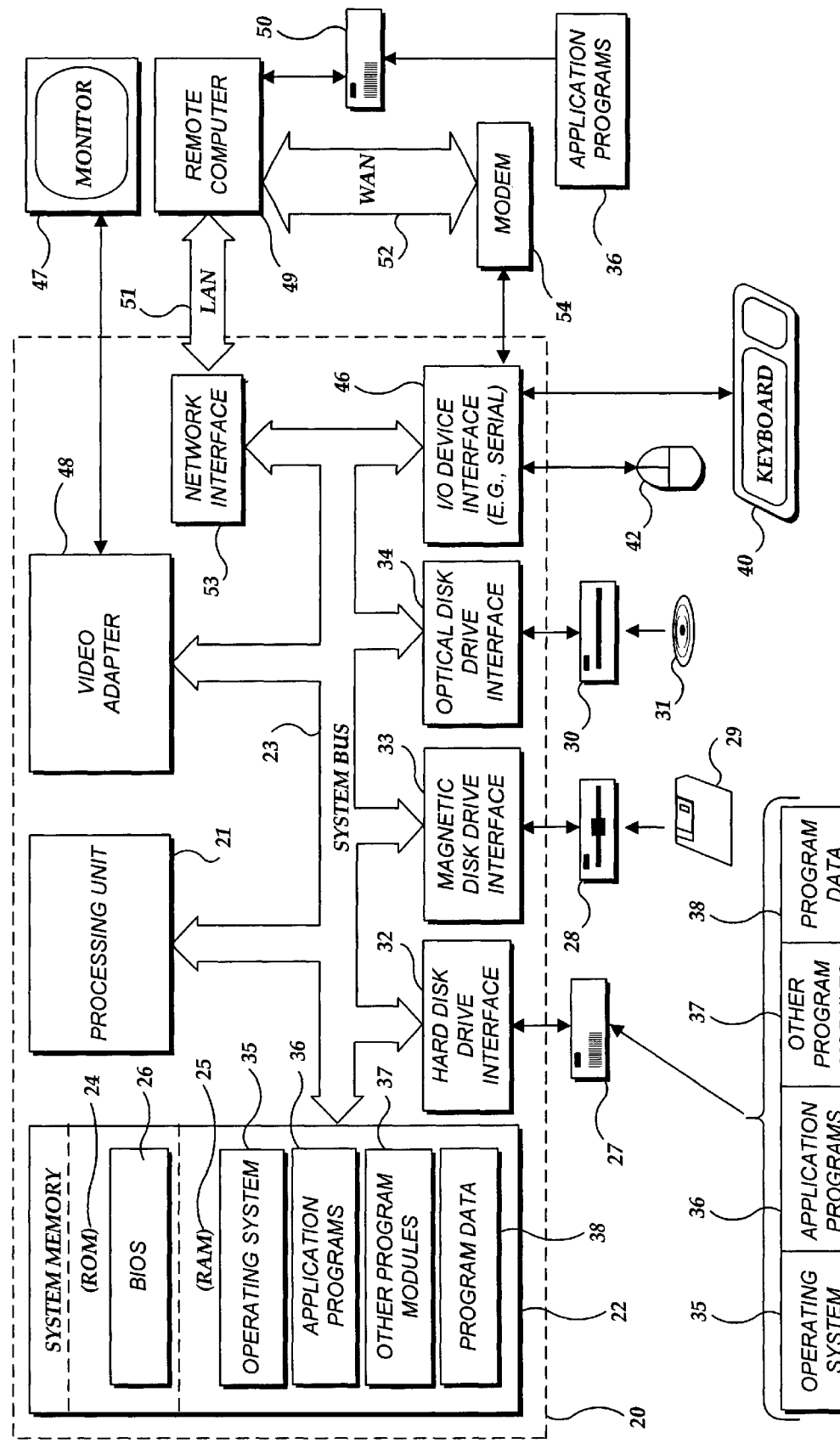
FIG. 1 displays an overview of an exemplary operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components, including the system memory, to the processing unit 21. The system bus 23 may be any of several types of bus structures including a memory bus or memory controller, a peripheral bus, and a local bus using any of a variety of bus architectures. The system memory includes read-only memory (ROM) 24 and random-access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk, a removable magnetic disk 29 and a removable optical disk 31, it should be appreciated by those skilled in the art that other types of computer-readable media, which can store data that is accessible by a computer, such as magnetic cassettes, flash memory cards, digital video disks, Bernoulli cartridges, random-access memories (RAMs), read-only memories (ROM), and the like, may also be used in the exemplary operating environment.

A number of program modules may be stored on the hard disk, magnetic disk 29, optical disk 31, ROM 24 or RAM 25, including an operating system 35, one or more programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Presentation Program Architecture

Figure 2:
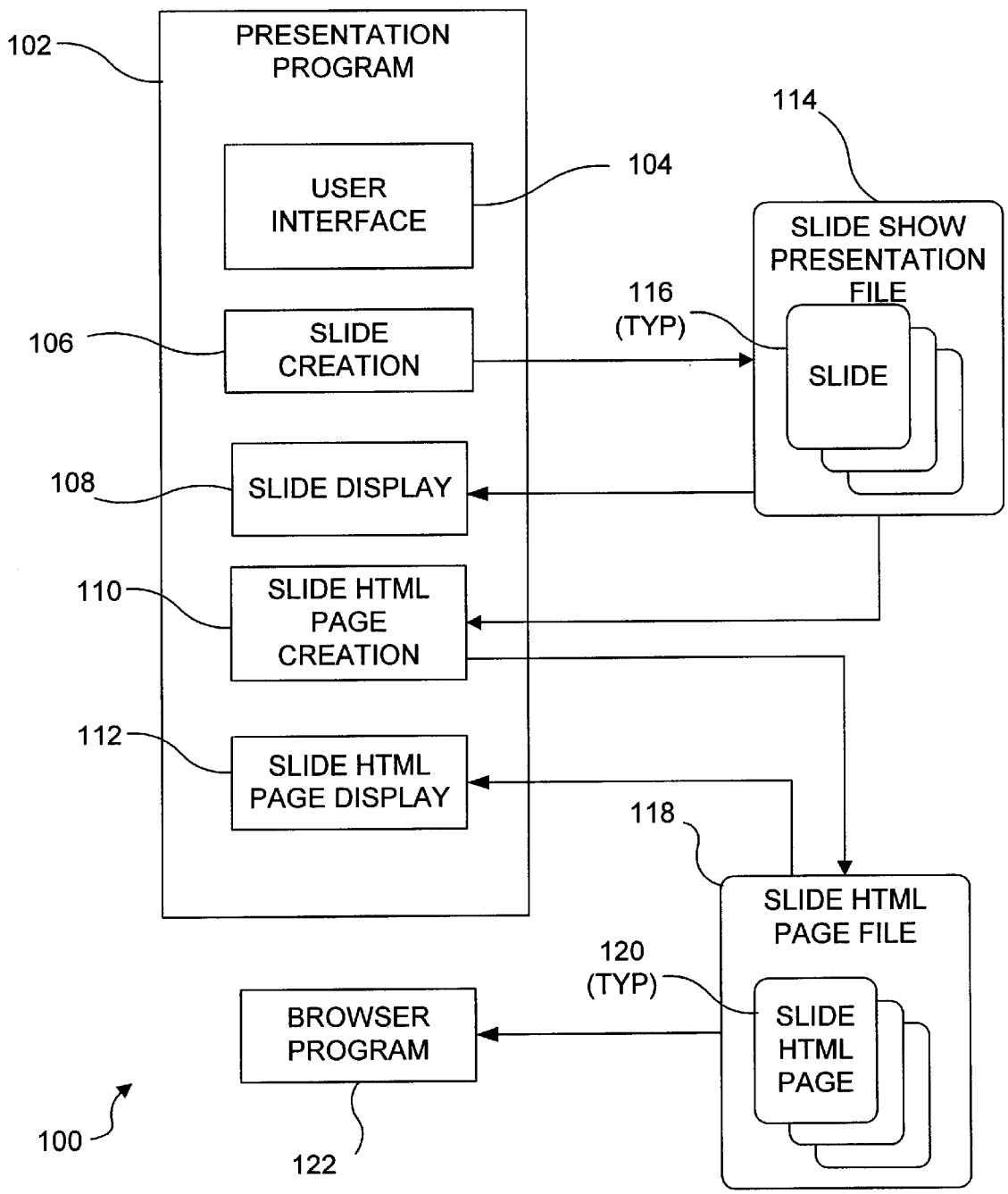
FIG. 2 displays an overview of an exemplary presentation program for creating slides and translating the slides into slide HTML pages.

FIG. 2 illustrates the architecture of a presentation program 102 in accordance with the present invention. The presentation program 102 provides a user with the ability to create and edit a set of one or more "slides" 116, and to "present" or display one or more of the set of slides. The set of slides is referred to as a "slide presentation" in a file 114. The slide presentation file 114 is generally stored on a computer storage medium, such as the disk drive 27 (FIG. 1). Each slide 116 is a discreet collection of visual information including text, graphic images, movies, animations and transitions between slides. The slide 116 may also include an audio clip that is associated with the slide and played when the slide is visually displayed.

The slide presentation program 102 also includes a user interface (UI) module 104. The UI module 104 presents an "Options" dialog window 302 (FIG. 4), discussed in further detail below. Briefly, the Options dialog window 302 displays information for setting parameters that control the scaling of graphically displayed objects for a selected slide HTML page. The UI module 104 also presents a "Custom Animation" dialog window 402 (FIGS. 6A–6D), which allows a user to specify various types of effects for displayed objects in a slide HTML page. The slide presentation program 102 also includes a slide creation module 106, which provides a user with the ability to create, edit, and organize a set of slides. Techniques for creating, editing, and organizing a set of slides are known in the art, and are not discussed in detail here, except where relevant to the present invention.

The slide presentation program 102 further includes a slide display module 108 that contains program code for controlling a graphical display of the slides 116 as a slide show. During the presentation of the slide show, the slide display module 108 retrieves a slide 116 and displays the slide on an output medium, such as a display screen 47 (FIG. 1). Since a slide can contain multimedia data, displaying a slide includes playing audio data, as well as visually displaying the content of the slide. Specifically, displaying a slide includes displaying text, movies and graphics contained within the slide, which may also include animations, and playing an audio clip that may be associated with the slide. An audio clip is a block of data representing sound, and may be stored in one of a plurality of storage formats. "WAV" and Musical Instrument Digital Interface ("MIDI") are two well-known formats for storing audio data.

The slide display module 108 provides several options for presenting an electronic slide show. The slide show module may automatically display a predetermined sequence of slides 116, displaying each slide for a corresponding predetermined amount of time. Alternatively, the slide display module 108 may display each slide 116 of a predetermined sequence of slides, pausing after displaying each slide until a user performs an operation, e.g., a mouse click and/or keyboard entry, that instructs the slide show module to "advance," by retrieving and displaying the next slide in the sequence of slides. The slide display module 108 also provides the ability for a user to present slides in a sequence that is not predetermined, by specifying the number or name of a slide 116 within the slide presentation file 114. A slide 116 may also have "links" built into it by a slide author using the slide creation module 106. A link includes a visual area on the slide and a corresponding address of a target slide. When a user selects the link area on the slide, the slide display module 108 automatically retrieves and displays the designated target slide. The target slide may be a slide within the same slide presentation file 114 as the current slide, or it may be a slide in a different slide show presentation.

The presentation program 102 includes a slide HTML page creation module 110 that translates the visual, audio and timing information for the slides 116 into a corresponding series of slide HTML pages 120 that are included in a slide HTML page file 116. As discussed in further detail below, the slide HTML page creation module 110 generates slide HTML pages 120 that include objects that correspond to the different types of objects in the slides 116 and stores the pages in a slide HTML page file 118.

The presentation program 102 may include a slide HTML page display module 112 that can present the slide HTML pages 120 as a slide show. Also, another program such as a browser program 122 may be used to present the slide HTML pages 120 as a slide show to a user. As explained in further detail below, the slide HTML page display module 112 or the browser program 122 will retrieve and graphically display the slides 120 from the slide HTML page file 118.

Figure 3:
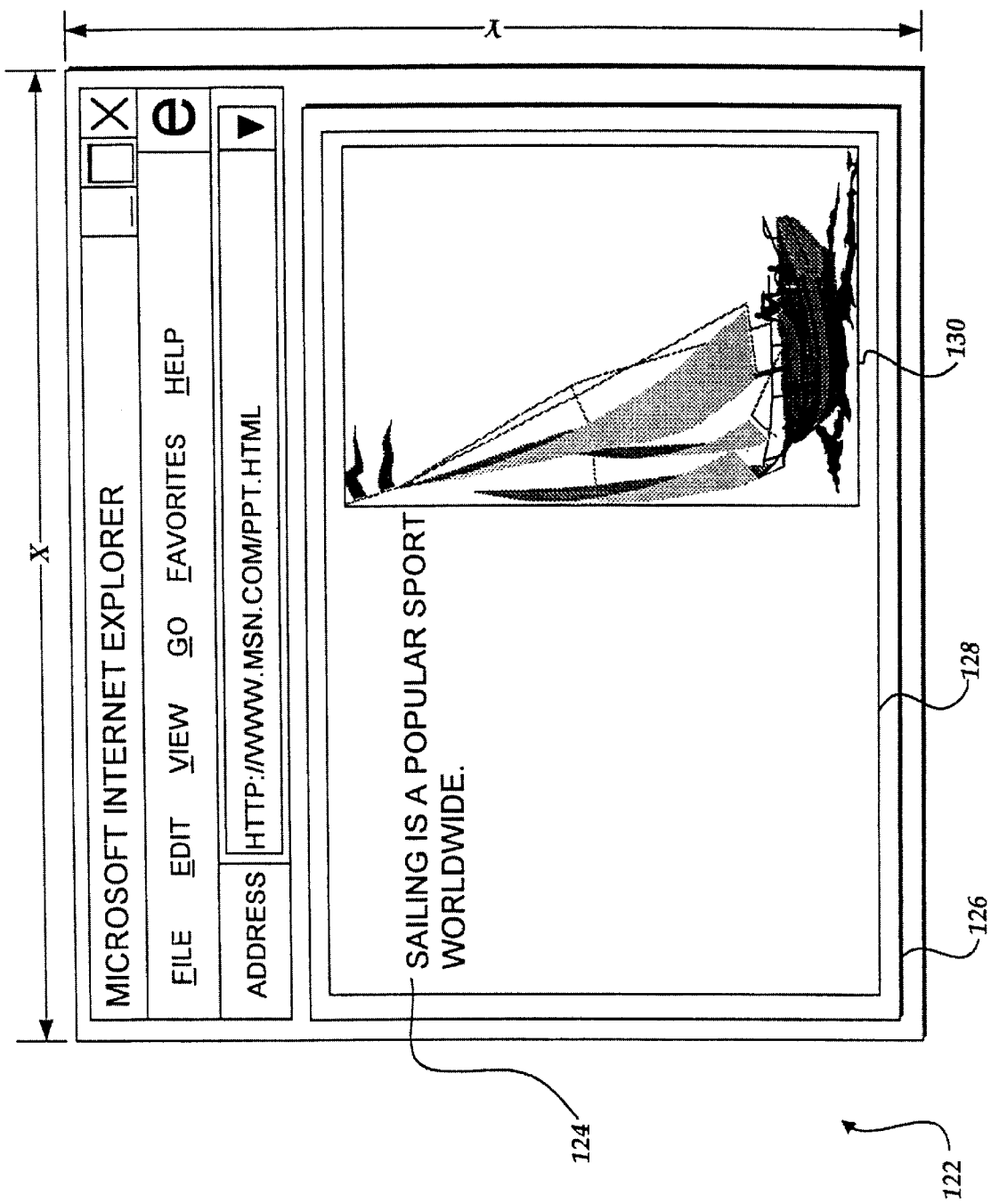
FIG. 3 shows an exemplary browser graphically displaying a slide HTML page that includes text and a graphic image.

FIG. 3 illustrates an exemplary graphical display of the browser program 122 and a display window 126 for displaying the objects in a sample slide HTML page that includes a display space 128, a text object 124 containing the words "SAILING IS A POPULAR SPORT WORLDWIDE.", and an image object 130 showing a graphic of a sailboat. In this example, the browser 122 has a height dimension (y) and a width dimension (x) that are approximately proportional. Also, the dimensions of the browser's display window 126 are equal to the originally encoded dimensions for the display space 103 of the sample slide HTML page.

Exemplary User Interface for Scaling Options

Figure 4:
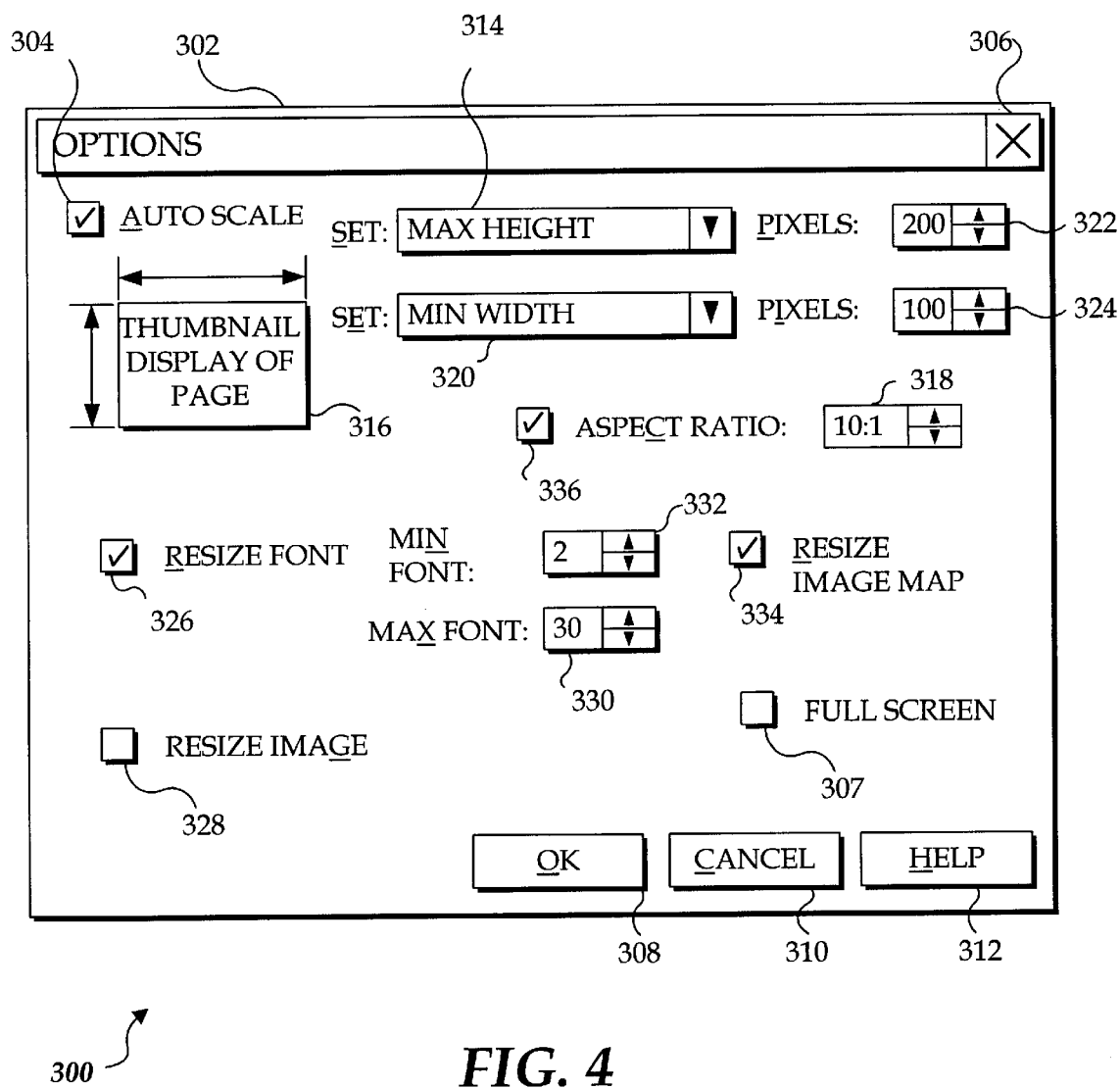
FIG. 4 shows an exemplary embodiment of a graphical user interface window for selecting different scaling options in the graphical display of the slide HTML page.

In FIG. 4, an overview 300 of an exemplary user interface window 302 is shown for graphically displaying options to a user that enable the contents of a selected slide HTML page to fit the dimensions of the display window 126 in the browser 122. The selection of an autoscale check box 304 causes the present invention to automatically fit the graphical display of every object included in a SlideObj container for a selected slide HTML page to the dimensions of the browser's display window 126. Additionally, when a check box 307 is chosen, a slide show for the slide HTML pages is displayed in a full screen mode by the browser 122. In this case, the size of the display window for the browser is set equal to the dimensions (full screen) of the display.

A thumbnail image 316 is provided that graphically displays all of the objects in the selected slide HTML page. A height drop-down menu 314 is provided to set either the maximum height or minimum height (not shown) for the graphical display of the display space included in the SlideObj container for the selected slide HTML page. A spinner control 322 is coupled to the height drop-down menu 314 and enables the selection of the number of lines of resolution (pixels) for the maximum and minimum heights that the present invention can use in fitting the height of the display space into the dimensions of a browser's display window. Similarly, a drop-down menu 320 is provided to set the maximum and minimum widths (not shown) that the present invention may use in resizing the width of the display space. A spinner control 324 is coupled to the width drop-down menu 320 that enables the selection of the number of lines of resolution for the maximum and minimum widths of the display space.

Further, a check box 336 and an associated spinner control 318 allow the aspect ratio employed by the present invention, when fitting the graphical display to a display window of a browser, to be selected. Another check box 326 an associated min font spinner control 332, and an associated max font spinner control 330 enable the selection of the maximum and minimum sizes of the fonts to be graphically displayed. Additionally, when a further check box 328 is selected, the herein disclosed embodiment of the present invention automatically resizes the dimensions of the graphical display of image objects to fit a browser's display window. Similarly, when another check box 334 is selected, the present disclosed embodiment of the invention automatically redimensions the graphical display of image maps to fit the browser's display window 126.

When a close box 306 is selected, the user interface window 302 is closed. The selection of an OK button 308 confirms the options selected in the user interface window 302 and closes the window. If a cancel button 310 is selected, the user interface window 302 closes and the present invention disregards any changes to the options selected in the window. Also, the selection of a help button 312 causes a facility to display information explaining the options that are selectable in the user interface window 302.

Architecture For DIV Tags Used In Slide HTML Pages With Objects

While the invention can be packaged in various ways depending upon the environment of use, in one actual embodiment, a first facility, e.g., the slide HTML page creation module 110, translates each type of object included in a slide into an HTML object and disposes each translated object at a related position in the slide HTML page. Clip region boundaries, i.e., the edges, for the displayed area (display space) of the slide HTML page are set so that any object outside the clip boundaries of the display space will not be rendered. The display space for the slide HTML page is set with a DIV tag. DIV tags are used to structure the graphical display of pages in an HTML document as a hierarchy of subdivisions. This hierarchy supports percentage-based dimensions for objects and other pages nested within the subdivisions created by the DIV tags.

The first facility also provides for creating a SlideObj container for at least one slide HTML page created from a slide. The divisions created by nested DIV tags enable the SlideObj container to provide default dimensions and a default font size for the display spaces and text objects in the slide HTML page that are contained in the SlideObj container. Since DIV tags are used to define the dimensions and font size for a SlideObj container, other DIV tags that are nested in each of the slide HTML pages may reference the default dimensions of the SlideObj container's display space as a percentage (greater than or less than 100%) to define the dimensions of the display space for each slide HTML page. Similarly, a font size for a text object in each slide HTML page can be referenced as a percentage (greater than or less than 100%) of the default font size in the SlideObj container.

In FIG. 5, an exemplary HTML code fragment 360 illustrates the nested divisions created by DIV tags in a slide HTML page so that an HTML object can be positioned in the slide HTML page's display space as a percentage of the dimensions of the display space. A text object, i.e., SAILING IS A POPULAR SPORT WORLDWIDE, is disposed within a division defined by a nested DIV tag 362. The position of this text object in the slide HTML page's display space is based on a percentage that is relative to the dimensions of the display space defined by the division created by DIV tag 354 for the page. In this case, the top of the text object is disposed at 80.25% of the height (100% of 476 pixels) of the display space for the slide HTML page and the left side of the text object is positioned at 8.5% of the width (100% of 635 pixels) of the display space.

The first facility also provides for nesting text, movie, animation, transition, image, and image map objects within the divisions created by DIV tags as a percentage relative to another position of another object in the display space of a slide HTML page. In this way, a hierarchy of relative positions may be created for objects disposed in the display space of the slide HTML page. For example, in FIG. 5, another text object, i.e., A PICTURE OF MY BOAT, has its position based on a percentage that is relative to the dimensions of the display space for a slide HTML page defined in the HTML code fragment 360. This text object is disposed in a division created by a nested DIV tag 364, which defines the object's top position as 30% of 80.25% of 100% (height of 476 pixels) of the display space of the slide HTML page. Similarly, an image object, i.e., "sailboat1.bmp", is disposed in a division created by a nested DIV tag 368 that defines a top position that is 105% of 80.25% of 100% of the display space of the slide HTML page.

Additionally, when a hyperlink is associated with an image object, the dimensions of a region associated with the image object are not expressed as a percentage of the dimensions of the display space of the slide HTML page. Instead, an image map tag 370 is employed to define an explicit set of coordinates defining the region of the image object that will activate the hyperlink when selected by a user. Since the image map object dimensions are not percentage based, the second facility employs at least one script to resize these dimensions to fit a display window's dimensions.

Exemplary Graphical User Interface For Controlling Animated Effects and Audio

Figure 6A:
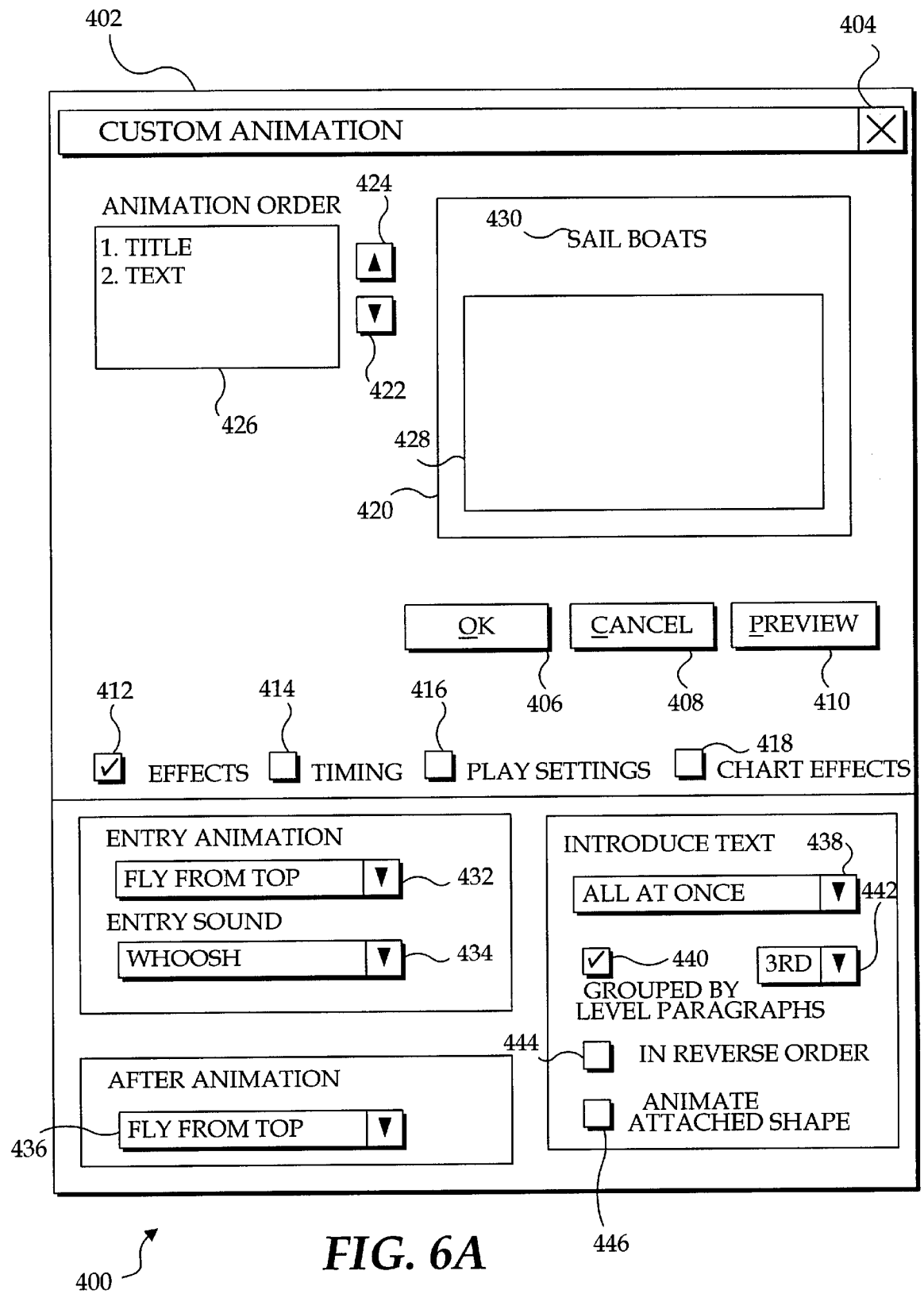
FIGS. 6A, 6B, 6C and 6D show exemplary embodiments of graphical user interface windows for selecting different animation options in the graphical display of the slide HTML page.

In FIG. 6A, an overview 400 of an exemplary user interface window 402 is shown for selectable animation effect options that may be customized by the user. When a close box 404 is selected, the user interface window 402 is closed. The selection of an OK button 408 confirms the options selected in the user interface window 402 and closes the window. If a cancel button 408 is selected, the user interface window 402 closes and the present invention disregards any changes to the options selected in the window. Also, the selection of a preview button 410 causes a facility to display a thumbnail-sized preview in a window 420 of the animated options chosen for a selected slide HTML page. A subwindow 426 shows the order for displaying animated objects in the selected slide HTML page. A pair of radio buttons 424 and 426 are provided to enable the user to manually change the order for displaying the animated objects. In the window 420, a thumbnail image preview is shown for a title object 430 and a text block object 428 that are included in a selected slide HTML page.

When an effects check box 412 is selected (as shown), several customizable animation effect options are displayed. The user may choose a drop-down menu 432 to select an entry animation effect and another drop-down menu 434 to choose an entry sound effect for an animated object in the selected slide HTML page. Yet another drop-down menu 436 is provided for choosing the after-animation effect for the animated object. A drop-down menu 438 enables the user to select an animation effect for introducing text included in the selected slide HTML page. If a check box 440 is selected (as shown), a drop-down menu 442 enables a user to choose the grouping level for paragraphs from the drop-down menu 442. When a check box 444 is selected, text is displayed in reverse order. Also, when a check box 446 is chosen, a shape attached to the text will be animated with a selected animation effect.

Figure 6B:
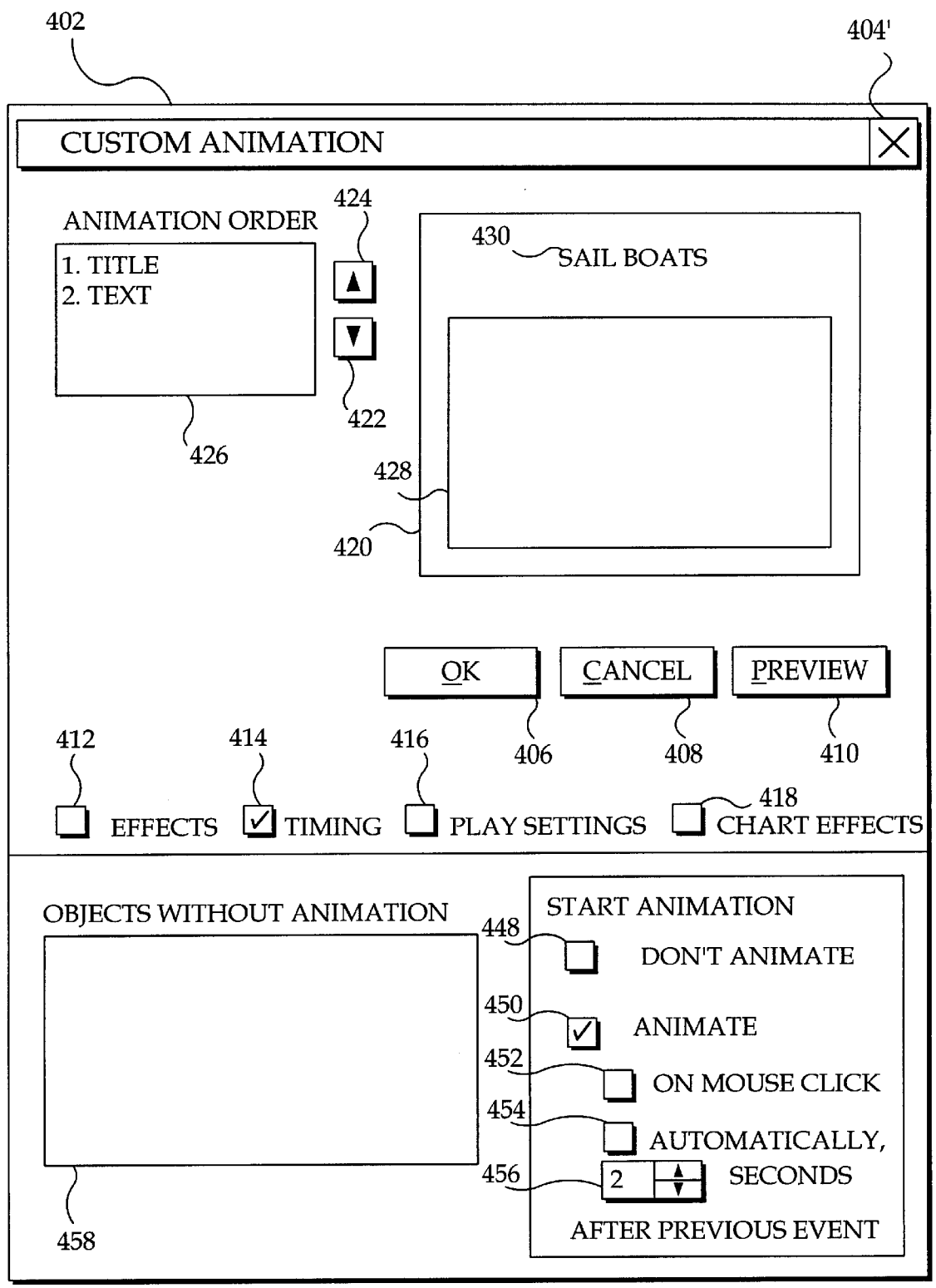

In FIG. 6B, an overview 400' of an exemplary user interface window 402' is shown for animation timing options that may be customized by the user. When a check box 414 is selected, the user interface window 402' displays several timing options for animations. A subwindow 458 is provided that displays non-animated objects that are included in the selected slide HTML page. If a check box 448 is chosen, none of the objects included in the selected slide HTML page will be animated. However, if a check box 450 is selected, the timing of the animated objects may be controlled by different options. When a check box 452 is chosen, an animated object will start an effect when a mouse click is detected. Also, if a check box 454 is selected, the user may employ a spinner control 456 to select the amount of time before the selected animation will start, after the performance of a previous animation.

Figure 6C:
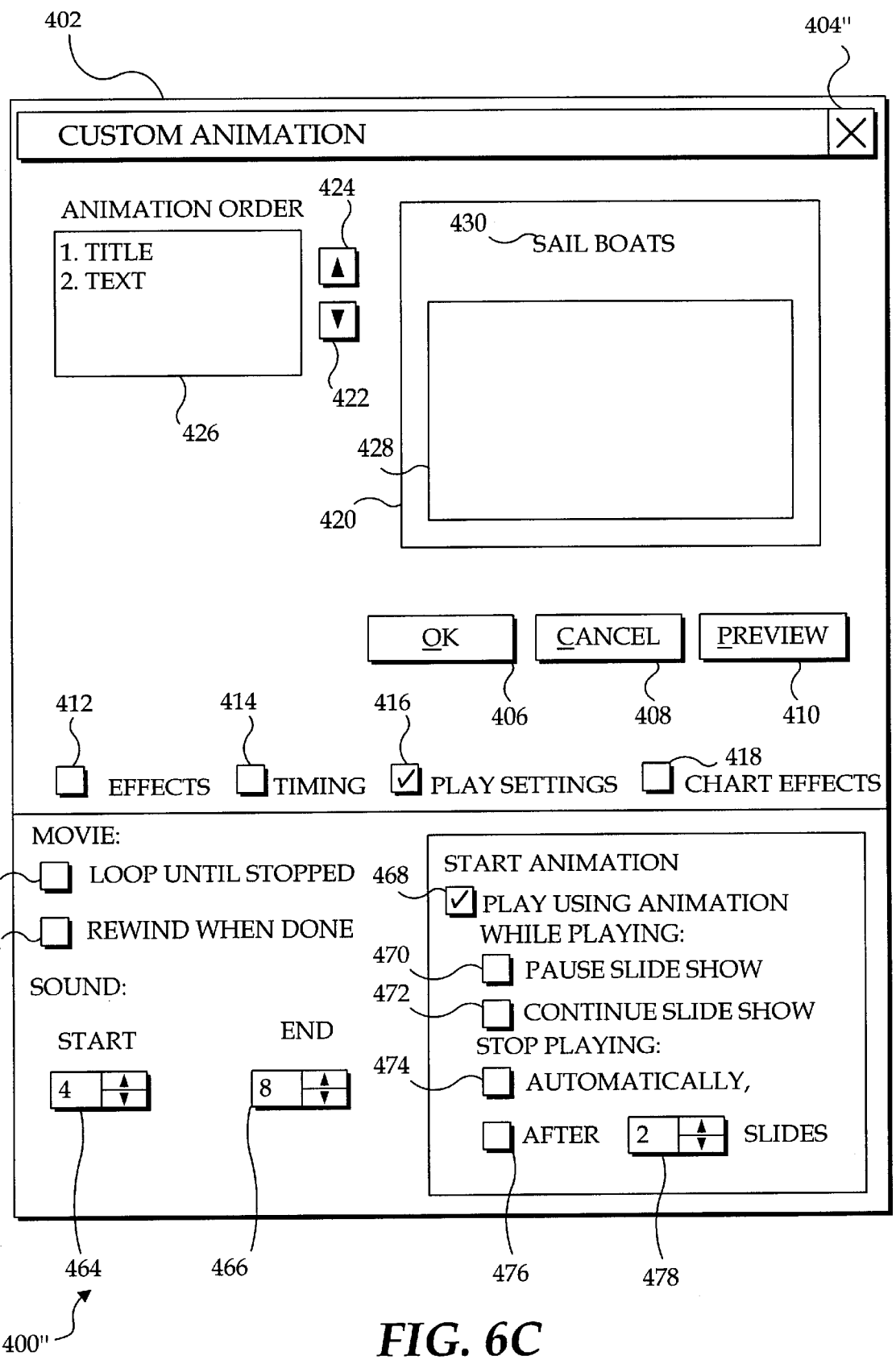

In FIG. 6C, an overview 400" of an exemplary user interface window 402" is shown for animation play setting options that may be customized. When a check box 416 is selected, the user interface window 402" displays several play setting options for movies and sound (audio) clips. It is envisioned that the present invention may play movie and audio clips that have a variety of different file formats including QTM (Quicktime), AVI (Audio Visual Interleave), MDI (Musical Instrument Device Interface), MPEG (Motion Picture Expert Group) and WAV.

For movies, when a check box 460 is chosen, the movie will continuously loop until stopped by some form of user input. Also, if a check box 462 is selected, the movie will rewind when it has played. A spinner control 464 enables the user to index when an audio clip will start and another spinner control 466 provides for indexing the end of the clip.

If a check box 468 is chosen (as shown), the selected movie and/or audio clip will play with the slide show animations. While playing, if a check box 470 is selected, the slide show will pause. However, if a check box 472 is chosen, the slide show will continue to be presented while the movie and/or audio clip is playing. Additionally, when a check box 474 is selected, the clip will stop playing automatically. Also, if a check box 476 is selected, a spinner control 478 may be employed to choose how many slides may be presented before the clip will stop playing.

Figure 6D:
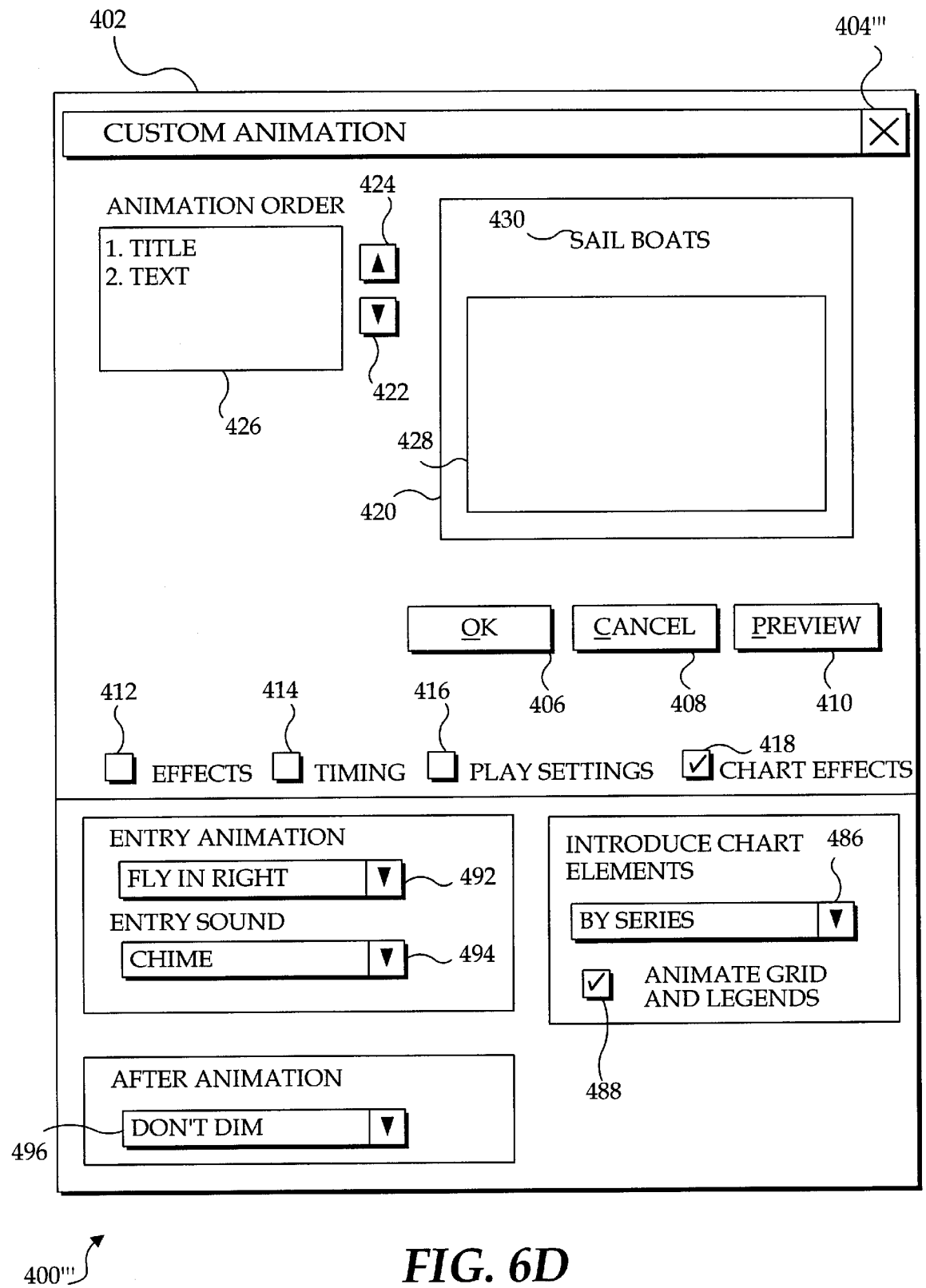

In FIG. 6D, an overview 400''' of an exemplary user interface window 402''' is shown for animation options (effects) for chart elements such as titles, legends, grids, and bar graphs. When a check box 418 is selected, the user interface window 402''' displays several options for chart effects to the user. The user may choose a drop-down menu 480 to select an entry animation effect and another drop-down menu 482 to select an entry sound effect for a selected chart element in the selected slide HTML page. Yet another drop-down menu 484 is provided for selecting the after-animation effect for the selected chart element. A drop-down menu 486 enables the user to select an effect for introducing chart elements included in the selected slide HTML page. If a check box 488 is selected, the grid and legend chart elements are animated for the selected slide HTML page.

Flow Diagrams For Generating Slide HTML Pages From Slides

Figure 7:
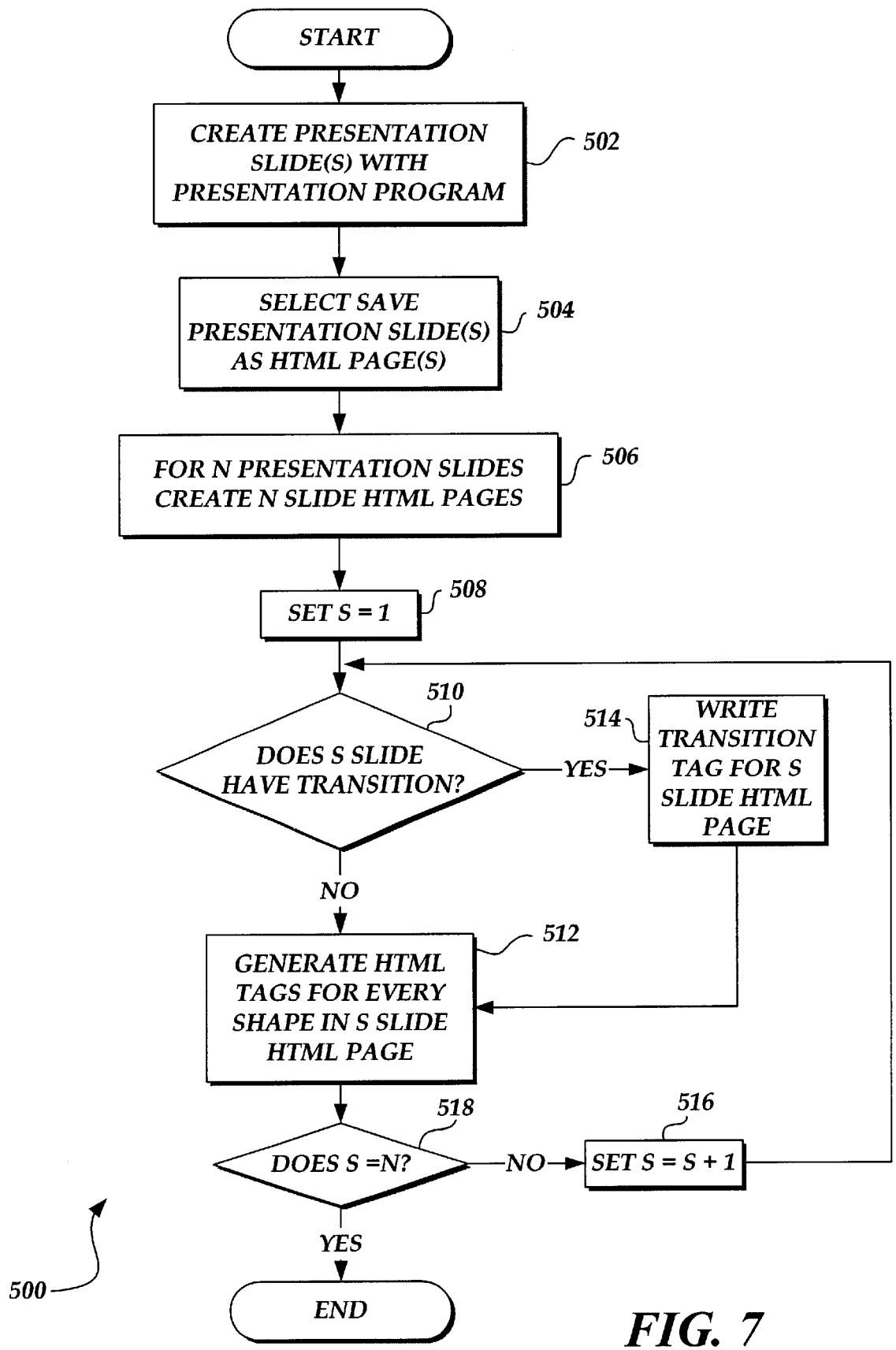
FIG. 7 displays an overview of a method for a first facility to generate a slide HTML page for each corresponding slide created by the presentation program.

FIG. 7 comprises a logic flow diagram 500 showing the process performed by a first facility, such as slide creation module 106, in accordance with the present invention for translating slides previously created with the presentation program 102 into a series of corresponding slide HTML pages 120 that may include graphically displayable objects, animations, transitions, movies and sound. A second facility, as described in greater detail below, automatically presents the graphical display of the objects included in the slide HTML pages as a slide show in a display window of the presentation program 102 or another program such as the browser program 122.

Moving from a start block in FIG. 7, in a block 502, the presentation program 102 is employed to create a series of slides for a slide show that are saved in the slide show presentation file 114 (FIG. 2). The logic moves to a block 504, where a "SaveAs" command is selected in the presentation program 102 that indicates to a first facility, such as the slide HTML page creation module 110, that the slides 116 in the slide show presentation file 114 are to be translated into a corresponding series of slide HTML pages 120. Then, in a block 506, for each of the (N) slides in the slide show presentation file 114, a corresponding slide (N) HTML page 120 is created. The display space for each slide HTML page is defined with a SlideObj container that contains other DIV tags and the contents of the slide HTML page.

At a block 508, the value of an "S" counter is set equal to one. The logic steps to a decision block 510 where a test is made to determine if the "S" slide 116 in the slide show presentation file 114 has a transition. If so, at a block 514, a transition tag identifying the type of transition is included in the "S" slide HTML page. A transition tag is created for and stored in each slide HTML page that is associated with a slide that provides for an animated transition between the slide and the next sequential slide included in the slide presentation file. The transition tag provides for identifying a type of in-place animation (effect) that is closely related (if not identical) to the animated transition between the associated slide and the next slide. Flowing to a block 512, HTML tags for every shape in the "S" slide HTML page are generated and included in the page. An animation tag is created for each object that corresponds to an animated object included in each slide associated with each slide HTML page. Also, the animation tags are stored in the slide HTML page and they identify a type of effect that is substantially similar to the animated object in the slide associated with the page. Alternatively, if the determination at the decision block 510 had been false, then the logic would have moved directly to the block 512.

Advancing to a block 518, the logic determines whether the "S" counter is equal to the total number (N) of slides 116 in the slide show presentation file 114. If not, the program jumps back to the decision block 510 and repeats the logical steps discussed above. However, if the "S" counter is equal to the total number (N) of the slides, i.e., all of the slides have been parsed, then the logic performed by the first facility moves to an end block and concludes.

Figure 8A:
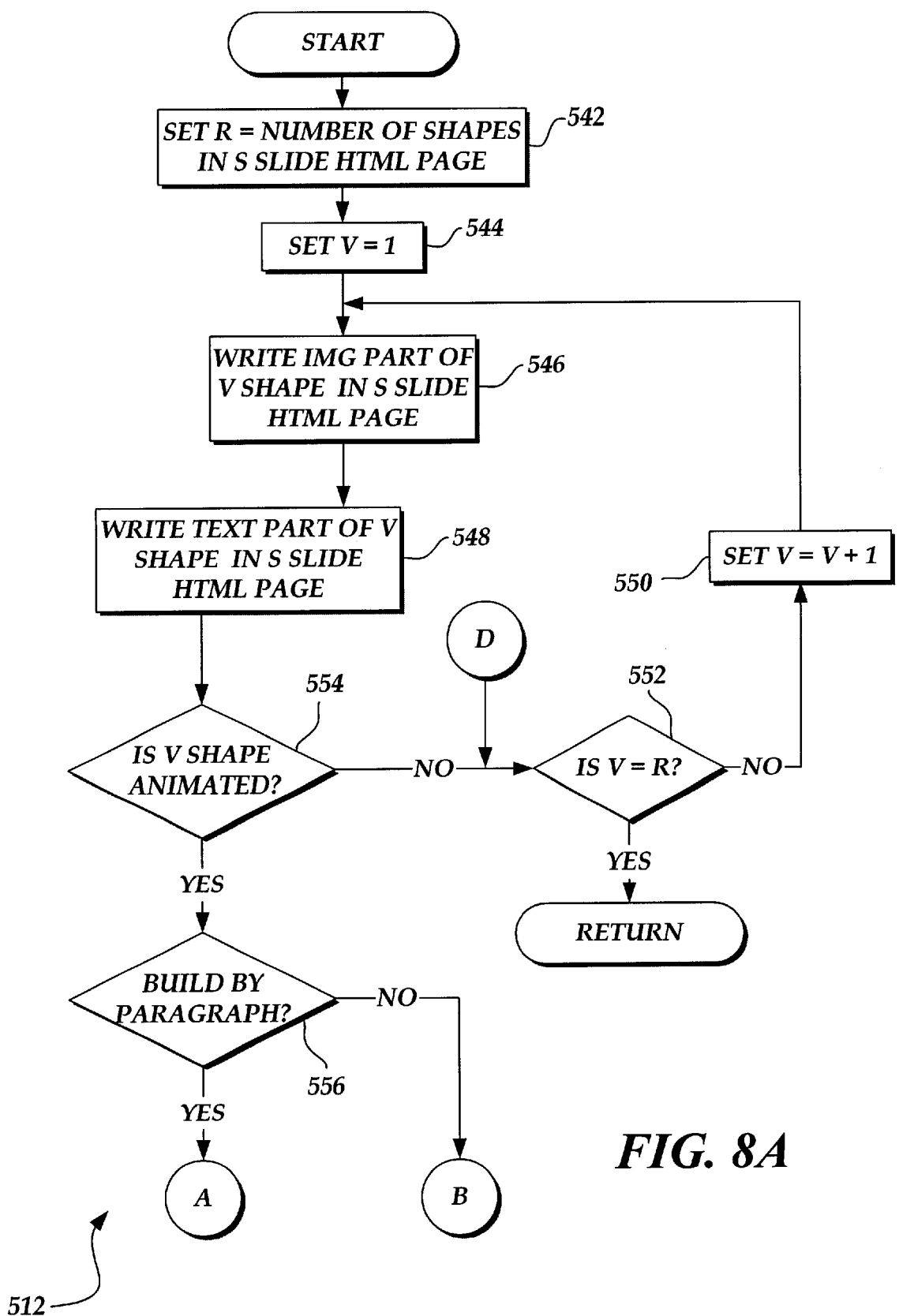
FIGS. 8A, 8B and 8C display an overview of a method for generating animation tags for images and text in the slide HTML page.
Figure 8B:
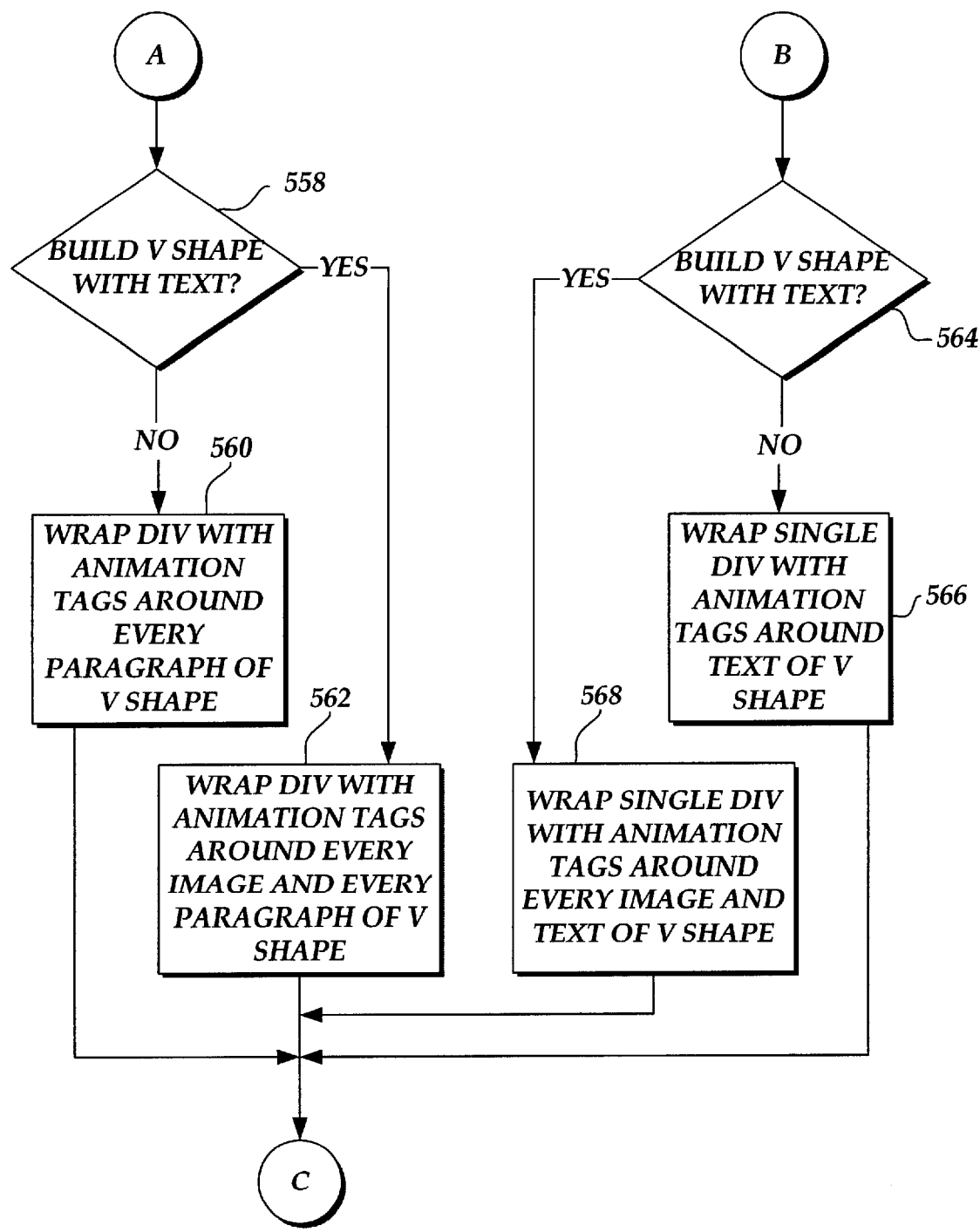
Figure 8C:
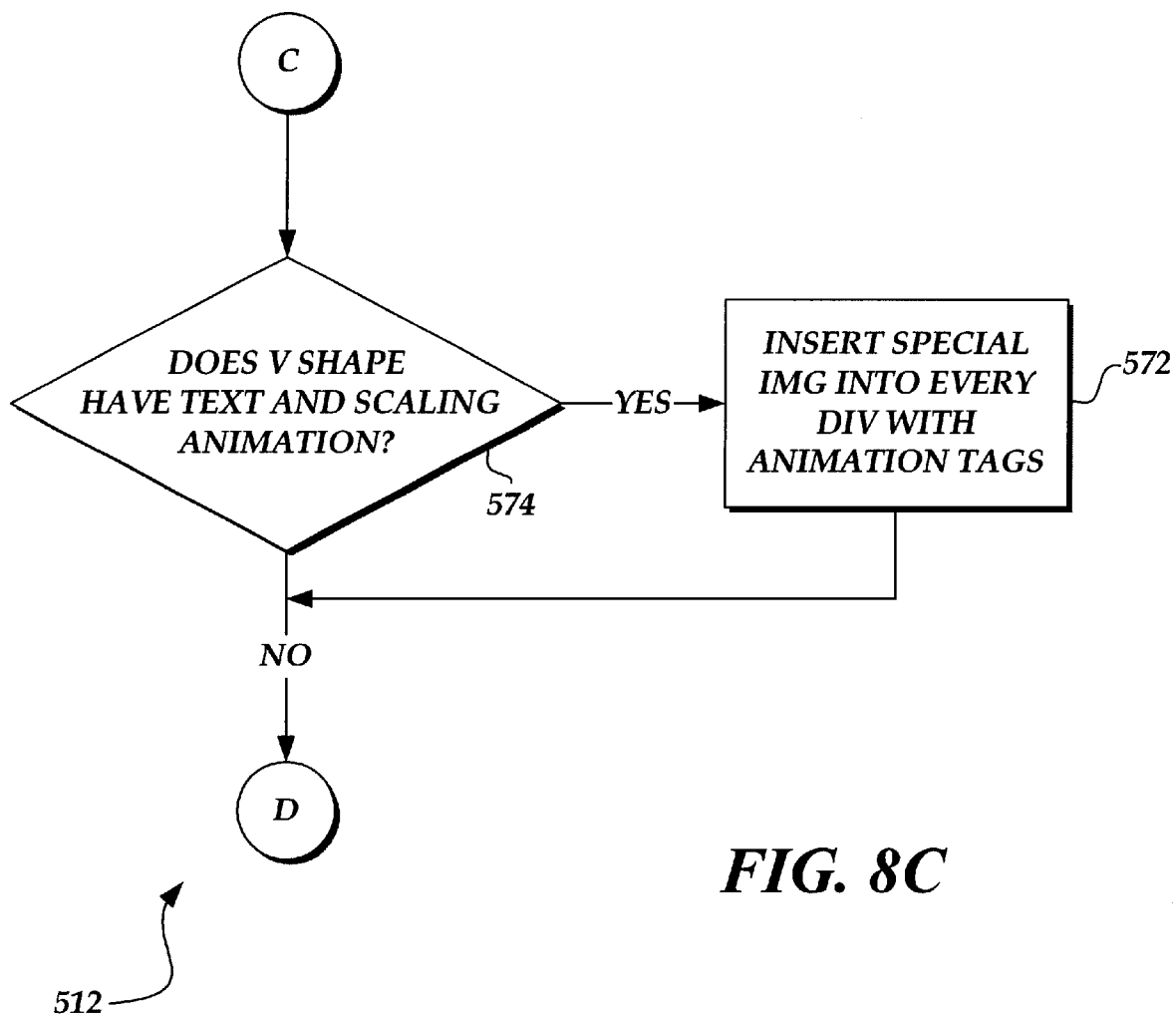

In FIGS. 8A, 8B, and 8C the logic associated with the block 512 is further illustrated. Moving from a start block, the logic steps to block 542 and the actual number of shapes in the "S" slide HTML page is stored in a variable identified as "R". Stepping to a block 544, another variable identified as "V" is set equal to one. At a block 546, if part of the "V" shape is an image, then an IMG tag is included in the "S" slide HTML page. Also, at a block 548, if part of the "V" shape is text, a TXT tag is included in the "S" slide HTML page.

Stepping to a decision block 554, a test is made to determine if the "V" shape is animated. If false, the logic steps to another decision block 552 and another test is performed to determine if the "V" variable is equal to the "R" variable, i.e., have all of the shapes in the "S" slide HTML page been processed? If yes, the logic returns to the main logic flow shown in FIG. 7. However, if the determination at the decision block 552 is false, the logic will advance to a block 550 and the "V" variable will be incremented by one. Next, the logic will jump back to the block 546 and repeat substantially the same logical steps discussed above.

Alternatively, if the determination at the decision block 554 was found to be true, i.e., the "V" shape is animated, then the logic would move to a decision block 556. A test would be performed to determine if the animated "V" shape is to be built with paragraphs. If the determination is false, the logic will flow to a decision block 564 as shown in FIG. 8B. Also, if the determination at decision block 556 is true, the logic will advance to a decision block 558 as illustrated in FIG. 8B.

Turning to FIG. 8B, if the determination at the decision block 558 is false, i.e., the animated "V" shape is to be built with text, the logic will advance to a block 560 and wrap DIV tags with animation around every paragraph of the "V" shape. Next, the logic will step to a decision block 574, as shown in FIG. 8C, and perform a test to determine if the "V" shape has text and/or scaling animations. Alternatively, if the determination at the decision block 558 had been true, the logic would have moved to a block 562 and DIV tags with animation would be wrapped around the image (IMG tag) and every paragraph of the "V" shape. Similarly, the logic will advance to the decision block 574 as illustrated in FIG. 8C.

However, if the determination at the decision block 556 had been false, as shown in FIG. 8A, the logic would have moved to the decision block 564, which is illustrated in FIG. 8B. A test is performed at the decision block 564 to determine if the "V" shape is to be built with text. If false, the logic moves to a block 566 and a single DIV tag with animation is wrapped around the text (TXT tags) of the "V" shape. Next, the logic would step to the decision block 574 as shown in FIG. 8C. Also, if the test at the decision block 564 had been true, the logic would have moved to a block 568 and a single DIV tag with animation would be wrapped around the image (IMG tag) and text (TXT tag) for the "V" shape. In a similar way, the logic would move to the decision block 574 shown in FIG. 8C.

Turning to FIG. 8C, a test is performed at the decision block 574 to determine if the "V" shape has text and scaling animation. If so, the logic moves to a block 572 and special IMG tags are inserted into every DIV tag with animation. Next, the logic jumps back to the block 552 in FIG. 8A and the logical steps outlined above are repeated. Also, if the determination at the decision block 574 had been false, the logic would jump directly to the block 552 and perform substantially the same steps outlined above.

Additionally, the present invention automatically calls build scripts to generate the object animation and transition animation tags. These scripts build an animated object for each object animation tag and an animated transition for each transition animation tag included in the SlideObj container for the selected slide HTML page. The scripts also build an animation queue for controlling when the effects for the animated object and animated transition are displayed. Some of the animated transition effects include box in, box out, circle in, circle out, wipe up, wipe down, wipe right, wipe left, vertical blinds, horizontal blinds, checkerboard across, checkerboard down, random dissolve, split vertical in, split vertical out, strips left down, strips left up, strips right down, strips right up, random bars horizontal, random bars vertical, and random. Also, the animated object non-scaled effects include crawl, peek, and fly and the scaled effects comprise spiral, zoom, stretch, and swivel.

It is envisioned that other program modules 37, shown in FIG. 1, may be called by the scripts to build the animation effects for the object and transition animation tags and build the animation queue that controls the order and timing of the various animations. For example, the scripts may call other program modules such as JavaScripts and VBScripts Although the present invention automatically generates object animation tags and transition animation tags substantially similar to the animations in the corresponding slides in the slide presentation file, the user may also choose to customize the animation effects, timing and play settings defined for these tags and create new animations for objects that are not animated in the corresponding slides.

As discussed above, the controls illustrated in FIGS. 6A, 6B, 6C and 6D enable the user to extensively customize the type and behavior of each animated object and animated transition effect included in a selected slide HTML page for display by the browser. The effects for the animated objects may be autonomous or they may require some type of input to be displayed. The animation effects for the animated objects may be displayed until either the animation queue times out or an interrupt is received. An interrupt may occur when a particular key on a keyboard is actuated or a pointing device is selected.

Flow Diagram For Automatically Displaying Transitions, Animations and Audio

The second facility of the present invention is employed with the slide HTML page display module 112 or the browser program 122 to automatically present a slide show to the user with slide HTML pages 120 stored in the slide HTML page file 118. The second facility causes transition and animation effects, movies and audio objects to be displayed/played along with the graphical display of non-animated objects in the slide HTML page 120.

Figure 9:
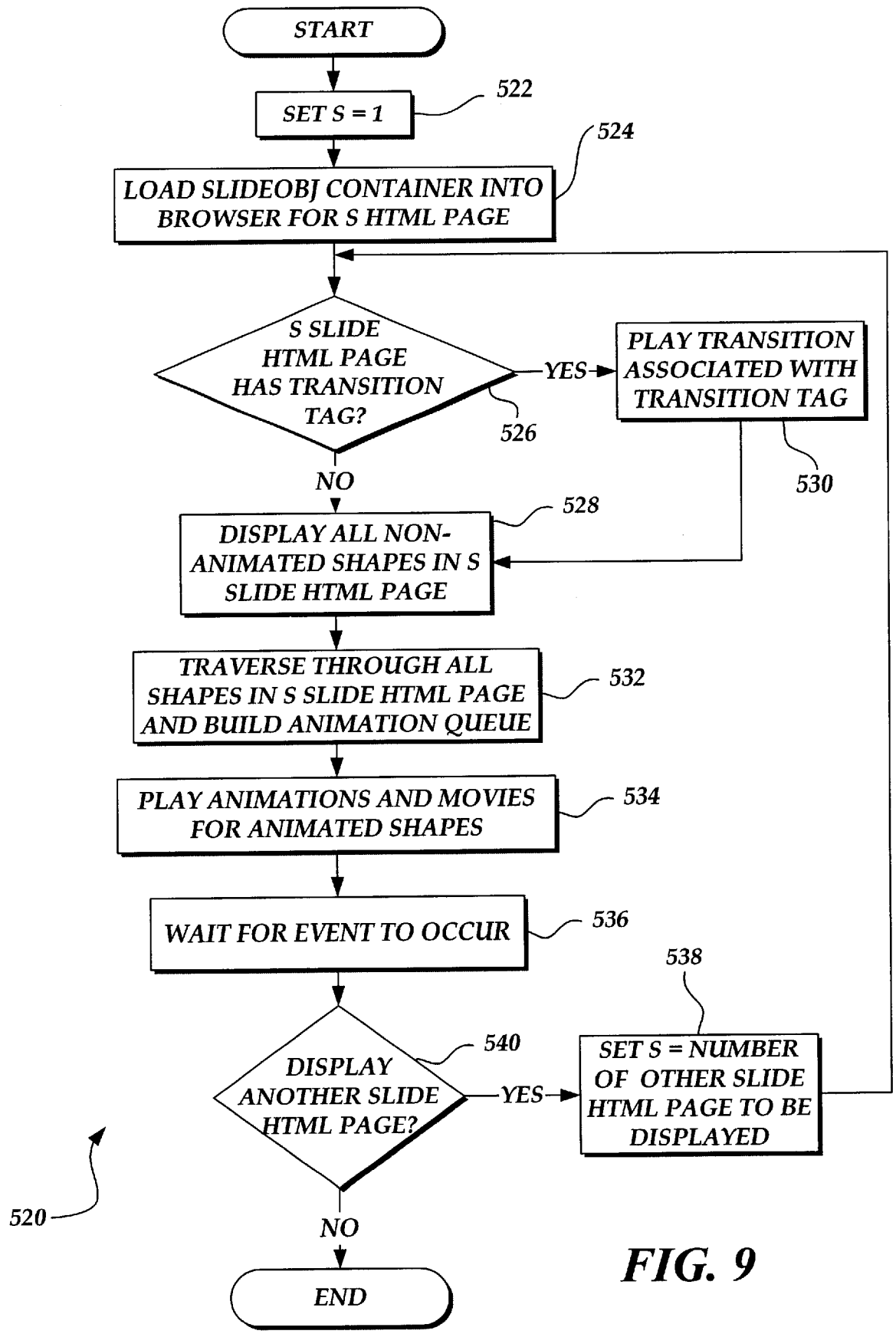
FIG. 9 displays an overview of a method for a second facility to present a slide show with animations, transitions, movies and audio clips with a series of slide HTML pages.

An overview 520 of the logic employed by the second facility is shown in FIG. 9. Moving from a start block, the logic steps to a block 522 and a variable identified as "S" is set equal to one. At a block 524, the SlideObj container for the "S" slide HTML page is loaded into a browser program, i.e., an HTML-enabled viewing facility. The logic steps to a decision block 526 and a test is made to determine if the "S" slide HTML page has a transition tag. If so, the logic advances to a block 530 and the transition associated with the transition tag is played by the second facility. The logic steps to a block 528 and all non-animated shapes in the "S" slide HTML page are displayed by the browser. However, if the determination at the decision block 526 was false, the logic would have moved directly to the block 528.

At a block 532, the logic traverses through all shapes in the "S" slide HTML page and builds a list (queue) identifying the type and playback order of animations in the page. The logic flows to a block 534 where the browser plays all movies and animations for animated objects. The logic steps to a block 536 where the second facility waits for an event to occur, e.g., a timer to time out, a mouse click or a keyboard entry.

After the event has occurred at the block 536, the logic moves to a decision block 540 and a test is made to determine if another slide HTML page is to be displayed. If yes, the logic advances to a block 538 and the "S" variable is set equal to the number identifying the other slide HTML page to be displayed. The other slide HTML page may be the next, previous, or an out-of-order slide HTML page depending on the contextual meaning of the event that occurred at the block 536. Leaving the block 538, the logic loops back to the decision block 526 and repeats the logical steps discussed above. However, if the determination at the decision block 540 was false, the logic would move to an end block and the display of the slide show by the browser would conclude. In one embodiment, when the presentation of the slide show is terminated by the second facility, a slide HTML page is graphically displayed with a black background and white colored text, e.g., "END OF SLIDE SHOW", which is centered in the middle of the display of the slide HTML page.

Figure 10A:
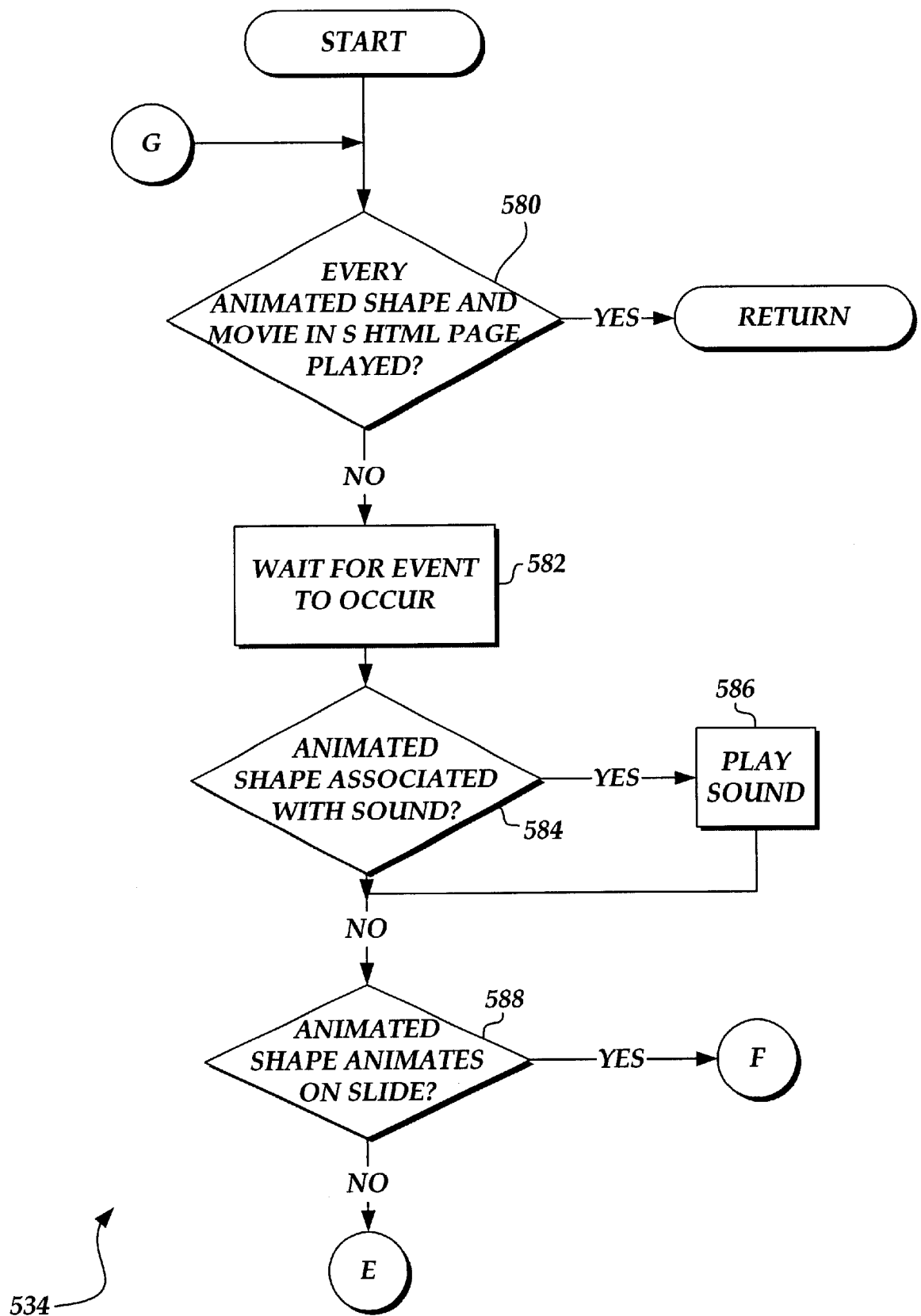
FIGS. 10A and 10B show an overview of a method for individually performing an animation for an animated object in the slide HTML page.
Figure 10B:
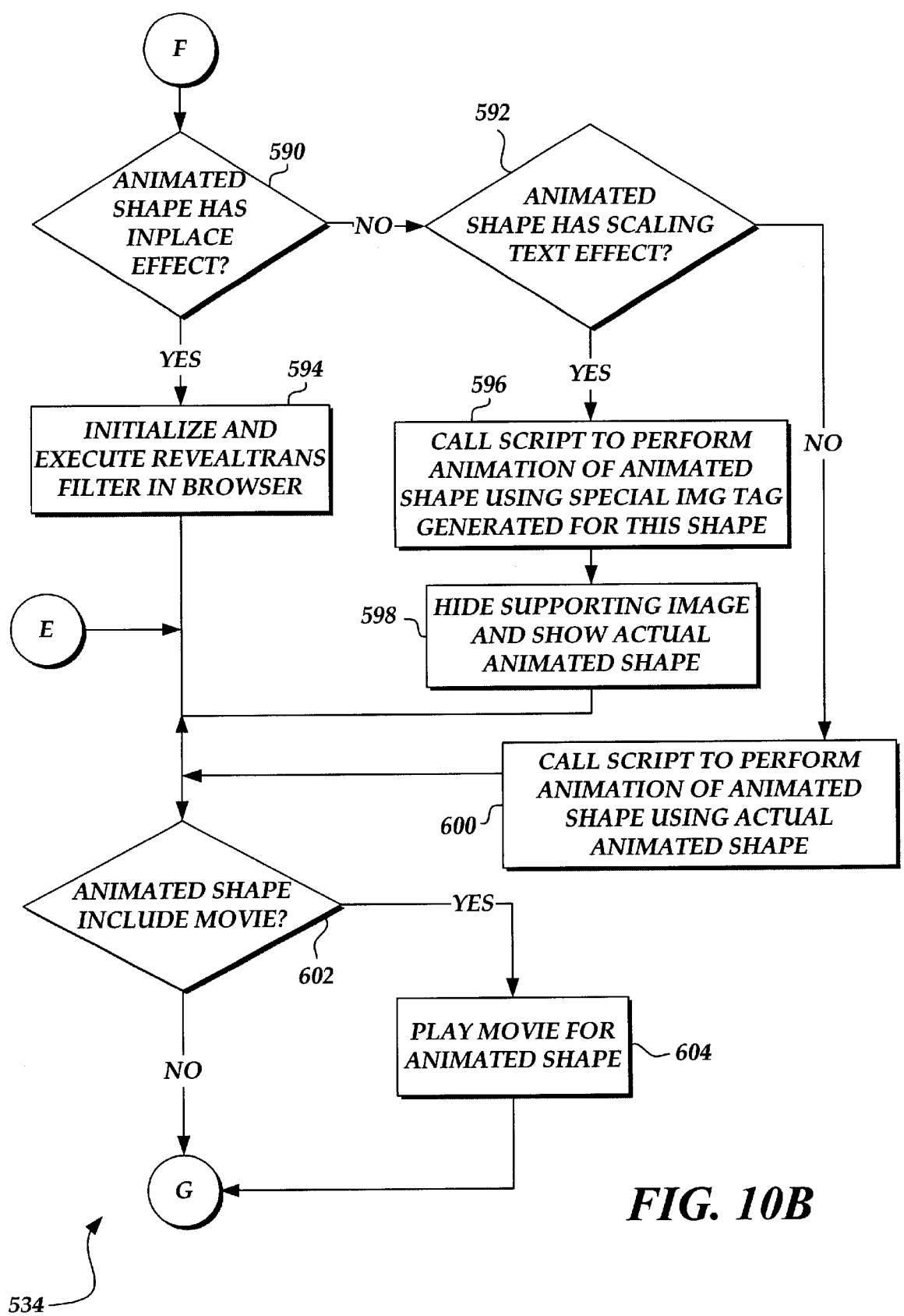

The logic described in the block 534 (FIG. 9) is shown in greater detail in FIGS. 10A and 10B. The logic moves from a start block in FIG. 10A to a decision block 580 where a test is made to determine if every animated shape and movie in the "S" slide HTML page has been played/animated. If so, the logic returns to the main logic flow in FIG. 9 at the block 534 and repeats the logical steps described above. However, if the determination at the decision block 580 is false, the program moves to a block 582 where the logic waits for an event to occur, e.g., a timer timing out, a mouse click or keyboard input, which identifies the animated shape in the animation queue to be played. Once the event has occurred, the logic steps to a decision block 584 and a test is performed to determine if the animated shape is associated with an audio clip. If true, the logic moves to a block 586 and the audio clip is played for the animated shape.

However, if the determination at the decision block 584 had been false, the logic would have advanced to a decision block 588. A test is performed as to whether the animated shape is to be animated in the graphical display of the slide HTML page. If not, the logic continues from the decision block 588 to a decision block 602 shown in FIG. 10B to perform a test to determine if the animated shape includes a movie. Turning now to the logic shown in FIG. 10B, if the test at the decision block 602 is true, the logic steps to a block 604 and a movie is played for the animated shape. After playing the movie, the logic will jump back to the decision block 580 illustrated in FIG. 10A and repeat substantially the same logical steps described above. Alternatively, if the determination at the decision block 602 had been false, the logic would have jumped directly to the decision block 580 shown in FIG. 10A.

Additionally, in FIG. 10A, if the determination at the decision block 588 had been true, the logic would have continued to a decision block 590 illustrated in FIG. 10B. A test is made at the decision block 590 to determine if the animated shape has an in-place animation effect. If affirmative, the logic steps to a block 594 and a "revealtrans" filter, preferably built into the browser, is initialized. The "revealtrans" filter is employed by the browser to display the in-place effect, as described in detail above. Next, the logic advances to the decision block 602 and performs substantially the same logical steps described above.

However, if the determination at the decision block 590 was false, the logic will move to a decision block 592 where a test will be made to determine if the animated text has a scaling text effect. If false, the logic flows to a block 600 and scripts are called to perform the animation for the animated object using the actual shape of the animated object. Next, the logic steps to the decision block 602 and performs substantially the same steps presented above.

Moreover, if the determination at the decision block 592 had been true, the logic would have continued to a block 596 where scripts would be called to perform the animation of the animated shape using the special IMG tag generated for this animated shape. Also, the logic performed at the block 600 substantially applies to the logic executed at the block 596. Next, the logic advances to a block 598 and the supporting image for the animated shape is hidden and the actual animated shape is made visible. Finally, the logic will step to the decision block 602 and perform substantially the same logical steps described in detail above.

Figure 11:
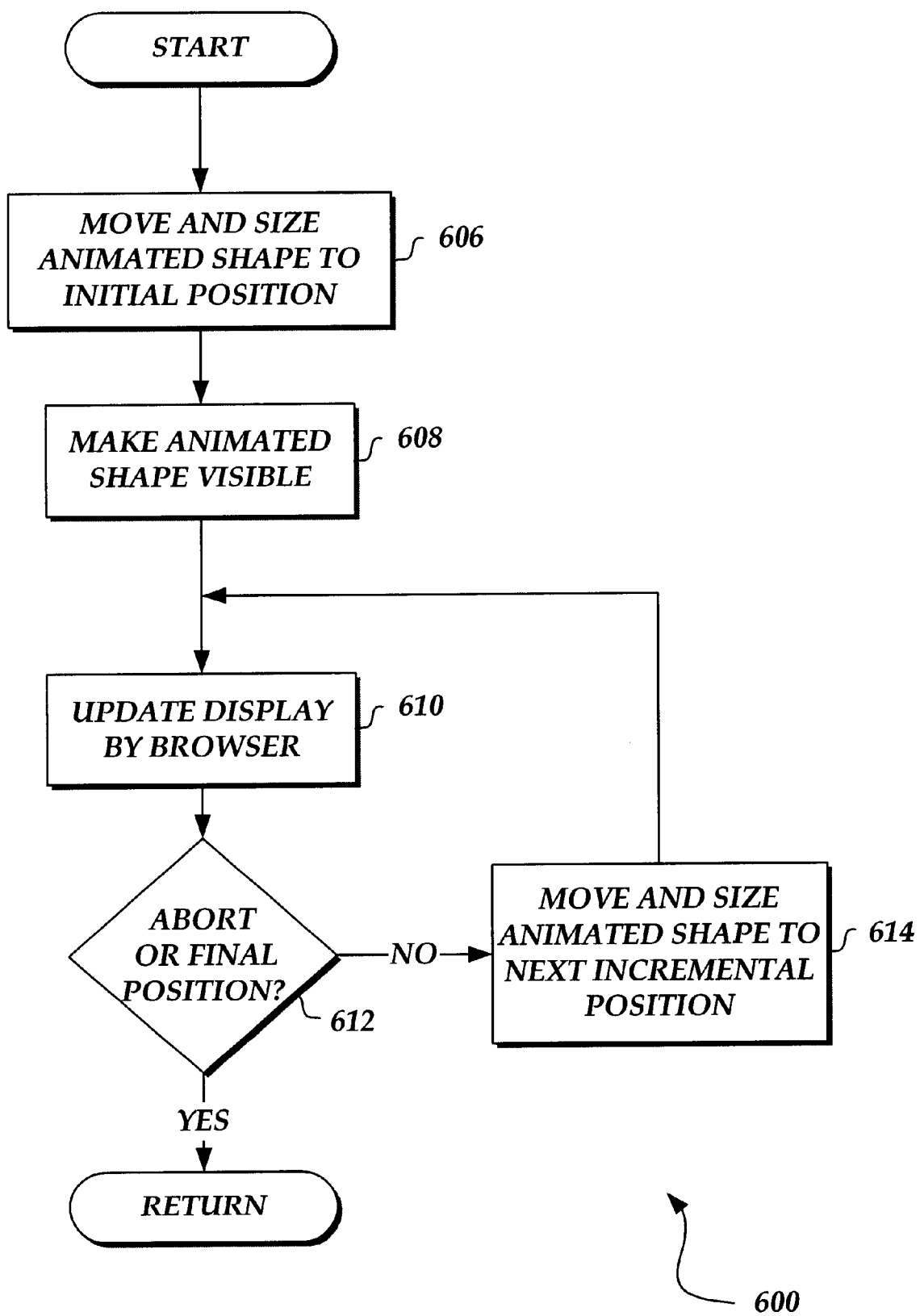
FIG. 11 illustrates an overview of a method for using the actual animated shape to perform an animation with the browser.

Looking to FIG. 11, the logic of the block 600 in FIG. 10B is shown in greater detail. Moving from a start block, the logic steps to a block 606 and the animated shape is moved to its initial position and sized to the display window of the browser program. Next, the logic flows to a block 608 where the animated shape is made visible. Advancing to a block 610, the display provided by the browser for the animated shape is updated. At a decision block 612, a test is made to determine if the animated object is at its final position or a command has been received to abort the further display of the animated shape. If negative, the logic continues to a block 614 and the animated shape is moved and sized to the next incremental position in the animation. Lastly, the logic jumps back to the block 610 and repeats substantially the same logical steps discussed above.

Although the embodiment of the present invention described above employs the HTML computer language, it is to be understood that the invention is also applicable to other types of computer languages that support percentage-based nesting of a size and a position of an object, including DHTML, CGI, and VRHTML. It is further to be understood that the first and second facilities could operate within the same program. For example, a program that is employed to generate the slide show from the original slide presentation file could also be associated with the viewing facility for displaying the slide show to the user.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating a slide show for presentation by a viewing facility, the slide show being generated from a plurality of slides that were originally created for a slide show to be presented by another facility, comprising:
    (a) saving each object in the plurality of slides created for presentation by the other facility in a corresponding series of pages, a page including each object associated with a corresponding slide;
    (b) generating a size for a display space of each page, the size of the display space being related to a size of a container for a page, the container including each object in the page and each object in the container being displayable in the display space of the page;
    (c) generating an animated object for each object in the page that is related to an animation of the object in the corresponding slide created for presentation by the other facility, the animated object being included in the container for the page;
    (d) generating a queue for defining an order for the display of each object and each animated object in each container of each page and defining a time line for presenting the generated slide show; and
    (e) employing the viewing facility to display the contents of each container for each page in accord with the order and the time line defined by the queue, so that the generated slide show is presented to a user in a graphical display related to the presentation by the other facility of the originally created slide show.

2. The method of claim 1, further comprising:
    (a) generating an animated transition for each page that is related to an animation of the transition between the corresponding slide and the next slide in the slide show created for presentation by the other facility; and
    (b) adding the animated transition to the time line of the queue, so that the animated transition is displayed between an end of presenting the page and starting the presentation of a next page for the generated slide show.

3. The method of claim 2, wherein generating the animated object and the animated transition further comprises:
    (a) generating an object animation tag that is stored in the container for the page; and
    (b) generating a transition animation tag that is stored in the container for the page.

4. The method of claim 3, wherein the object animation tag and the transition animation tag identify respective parameters including type, duration and order.

5. The method of claim 4, wherein the respective parameters for the object animation tag and the transition animation tag are employed to generate the queue that defines the order and time line for presenting the generated slide show.

6. The method of claim 1, further comprising selecting a mode for displaying the generated slide show, the mode including window and full screen, the size of the full screen mode being equivalent to the dimensions of a display displaying the generated slide show to the user.

7. The method of claim 1, further comprising:
    (a) selecting an entry animation for each animated object; and
    (b) selecting an exit animation for each animated object.

8. The method of claim 1, further comprising:
    (a) selecting an entry sound for each animated object; and
    (b) selecting of an exit sound for each animated object.

9. The method of claim 1, further comprising selecting a shape to be animated that is attached to the object, the object not being animated.

10. The method of claim 1, further comprising selectively ordering the presentation of each object and each animated object in each container of each page so that the queue defining the order for presenting the generated slide show is changed.

11. The method of claim 1, further comprising previewing the presentation of the generated slide show in a thumbnail display.

12. The method of claim 1, further comprising selecting the object in the page to not be animated.

13. The method of claim 1, further comprising:
    (a) when the object in the page is selected, generating an animated object in the page; and
    (b) enabling the selection of a trigger for a start of the animation for the animated object, the trigger including a time interval and selection of the animated object by a pointing device.

14. The method of claim 1, wherein the animation is an in-place animation, comprising: box in, box out, circle in, circle out, wipe up, wipe down, wipe right, wipe left, vertical blinds, horizontal blinds, checkerboard across, checkerboard down, random dissolve, split vertical in, split vertical out, strips left down, strips left up, strips right down, strips right up, random bars horizontal, random bars vertical, and random in-place animation.

15. The method of claim 1, wherein the animation is a nonscaled effect, comprising peek, crawl, and fly.

16. The method of claim 1, wherein the animation is a scaled effect, comprising spiral, zoom, stretch, and swivel.

17. The method of claim 1, further comprising playing a clip associated with the presentation of the generated slide show by the viewing facility, the clip including movie, sound and video.

18. The method of claim 17, further comprising selecting a start index and an end index for the sound clip associated with the presentation of the generated slide show.

19. The method of claim 17, further comprising selecting a continuously looped display of the movie clip associated with the presentation of the generated slide show.

20. The method of claim 17, further comprising selecting the movie clip to rewind after the movie clip is displayed.

21. The method of claim 17, further comprising pausing the presentation of the slide show when the clip is playing.

22. The method of claim 17, further comprising automatically ending the playing of the clip.

23. The method of claim 17, further comprising ending the playing of the clip after the presentation of a selected number of slides in the generated slide show by the viewing facility.

24. The method of claim 1, further comprising:
(a) generating a chart element animation tag for each chart element in the page that is related to the animation of the chart element in the corresponding slide created for presentation by the other facility, the chart element including legend, grid, text and graphics;
(b) generating an animated chart element for each chart element animation tag, the animated chart element being included in the container for the page; and
(c) adding the animated chart element to the queue, so that the animated chart element is presented in the generated slide show by the viewing facility.

25. The method of claim 24, further comprising:
(a) selecting an entry animation for each animated chart element; and
(b) selecting an exit animation for each animated chart element.

26. The method of claim 24, further comprising:
(a) selecting an entry sound for each animated chart element; and
(b) selecting an exit sound for each animated chart element.

27. The method of claim 24, further comprising selecting the order for displaying the animated chart element in the presentation of the generated slide show.

28. The method of claim 1, further comprising
(a) generating a size and a position for each object included in each page, the size and the position of each object being related to the size of the display space and being stored in the container of the page associated with the object; and
(b) determining if a dimension of a display is different than a corresponding dimension of the display space of the page and, if so,
(i) generating a scalar that is related to the difference in the dimension of the display and the corresponding dimension of the display space of the page, the scalar being employed to calculate another size for the display space of the page that is related to the size of a display and a default size of the page, the calculation of the other size of the display space causing the related size and position of the object to be changed in proportion to the other size of the display space; and
(ii) automatically relocating the graphical display of the display space of the page and the changed size and position of the object in the display, so that the user can view the object in the display space without having to scroll in the graphical display of the display space.

29. The method of claim 1, wherein the page, the display space and the object are encoded with a computer language selected from a group comprising HTML, DHTML, CGI, JavaScript, VBScript, and VRHTML.

30. The method of claim 29, further comprising employing a DIV tag to create sizes and positions for the page, the display space and the object that are percent based.

31. The method of claim 1, wherein the dimensions of the display space, page, and the dimensions and position of the object are measured in lines of resolution, so that the graphical display of the display space and the object automatically adjusts to the dimensions of a display.

32. The method of claim 1, wherein the graphical display of the object in the display space is automatically fitted to the size of the display when at least one of the dimensions of the display is dynamically changed.

33. The method of claim 1, wherein the viewing facility is a browser program.

34. The method of claim 1, wherein the viewing facility is a program module associated with another program including operating system, presentation, editor, spread sheet, desktop publisher, word processor, and database.

35. The method of claim 1, wherein the viewing facility presents the slide show to the user, further comprising a control for controlling the presentation of the slide show, the control performing functions that include advancing, reversing, pausing, and exiting when the control is selected.

36. The method of claim 1, wherein the page is scaleable to the size of the graphical display.

37. A computer-readable media having computer-executable instructions for performing the method recited in any one of claims 1, 2, 3, 6, 14, 15, and 16.

38. A method for generating a slide show for presentation by a viewing facility, the slide show being generated from a plurality of slides that were originally created for a slide show to be presented by another facility, comprising:
(a) employing a first facility for generating a scaleable page, the first facility implementing actions, including:
(i) saving each object in the plurality of slides created for presentation by the other facility in a corresponding series of scaleable pages, a scaleable page including each object associated with a corresponding slide;
(ii) generating a size for a display space of each scaleable page, the size of the display space being related to a size of a container for a scaleable page, the container including each object in the scaleable page and each object in the container being displayable in the display space of the scaleable page; and
(iii) generating a tag that is related to an animation in the corresponding slide created for presentation by the other facility, the tag being included in the container of the scaled page; and
(b) employing a second facility to determine when the viewing facility is selected to display the generated slide show, if true, the second facility implementing actions, including:
(i) generating an animated object for each tag, the animated object being included in the container for the scaleable page;
(ii) generating a queue for defining an order for the display of each object and each animated object in each container of each scaleable page and defining a time line for presenting the generated slide show; and
(iii) employing the viewing facility to graphically display the contents of each container for each scaleable page in accord with the time line defined by the queue, so that the viewing facility presents the generated slide show to a user in a graphical display related to the presentation by the other facility of the originally created slide show.

39. The method of claim 38, wherein the first facility is a module that is executed within the other facility that created the slide show for presentation by the other facility.

40. The method of claim 38, wherein the second facility is a module that is executed by the viewing facility.

41. A computer system for generating a slide show for presentation by a viewing facility, the slide show being generated from a plurality of slides that were originally created for a slide show to be presented by another facility, comprising:

(a) a memory that stores a plurality of logical instructions;

(b) a display for graphically displaying the object to a user; and (c) a processor coupled to the memory, the processor implementing the logical instructions, including:

(i) saving each object in the plurality of slides created for presentation by the other facility in a corresponding series of scaleable pages, a scaleable page including each object associated with a corresponding slide;

(ii) generating a size for a display space of each scaleable page, the size of the display space being related to a size of a container for a scaleable page, the container including each object in the scaleable page and each object in the container being displayable in the display space of the scaleable page;

(iii) generating an animated object for each object in the scaleable page that is related to an animation of the object in the corresponding slide created for presentation by the other facility, the animated object being included in the container for the scaleable page;

(iv) generating a queue for defining an order for the display of each object and each animated object in each container of each scaleable page and defining a time line for presenting the generated slide show; and (v) employing the viewing facility to graphically display the contents of each container for each scaleable page in accord with the time line defined by the queue, so that the viewing facility presents the generated slide show to a user in a graphical display related to the presentation by the other facility of the originally created slide show.

* * * * *

UNITED STATES PATENT AND TRADEMARK OFFICE
CERTIFICATE OF CORRECTION

PATENT NO. : 6,396,500 B1
DATED : May 28, 2002
INVENTOR(S) : I.I. Qureshi et al.

It is certified that error appears in the above-identified patent and that said Letters Patent is hereby corrected as shown below:

Column 1,
Line 63, "display only" should read -- display– only --

Column 3,
Line 9, "bold," should read -- bold, --
Line 9, "italic." should read -- *italic.* --

Column 6,
Line 42, "scaleable, page" should read -- scaleable page --

Column 21,
Line 34, "further comprising" should read -- further comprising: --

Signed and Sealed this

Fourteenth Day of January, 2003

JAMES E. ROGAN
*Director of the United States Patent and Trademark Office*